United States Patent
Mitsuo et al.

(10) Patent No.: US 11,352,066 B2
(45) Date of Patent: Jun. 7, 2022

(54) STEERING SUPPORT STRUCTURE

(71) Applicant: TOYOTA JIDOSHA KABUSHIKI KAISHA, Aichi-ken (JP)

(72) Inventors: Tetsu Mitsuo, Nisshin (JP); Masaya Ikeda, Nisshin (JP); Yukihiko Nakagawa, Nisshin (JP); Osamu Okitsu, Mishima (JP); Yuuichi Suzue, Hadano (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 453 days.

(21) Appl. No.: 16/574,102

(22) Filed: Sep. 18, 2019

(65) Prior Publication Data

US 2020/0094881 A1 Mar. 26, 2020

(30) Foreign Application Priority Data

Sep. 21, 2018 (JP) .............................. JP2018-177179

(51) Int. Cl.
| | |
|---|---|
| *B60J 7/00* | (2006.01) |
| *B62D 25/14* | (2006.01) |
| *B62D 1/16* | (2006.01) |
| *B62D 5/00* | (2006.01) |

(52) U.S. Cl.
CPC ............. *B62D 25/145* (2013.01); *B62D 1/16* (2013.01); *B62D 5/00* (2013.01)

(58) Field of Classification Search
CPC ........... A47C 4/028; A47C 1/124; A47C 4/02; A47C 3/04; A47C 5/04; B62D 25/145; A61P 43/00; B60R 21/01534; B60R 21/0153; B60G 11/27

See application file for complete search history.

(56) References Cited

U.S. PATENT DOCUMENTS

| | | | |
|---|---|---|---|
| 6,517,114 B1 * | 2/2003 | Scheib ................ | B62D 25/145 296/203.02 |
| 2002/0084667 A1 * | 7/2002 | Sutou .................. | B62D 25/145 296/70 |
| 2010/0090451 A1 * | 4/2010 | Atsumi ................ | B62D 25/145 280/779 |
| 2011/0233964 A1 * | 9/2011 | Matsutani ............ | B62D 25/145 296/193.02 |
| 2012/0049573 A1 * | 3/2012 | Atsumi ................ | B62D 25/145 296/193.02 |
| 2012/0049574 A1 * | 3/2012 | Atsumi ................ | B62D 25/145 296/193.02 |
| 2019/0016395 A1 * | 1/2019 | Kajikawa ............. | B62D 1/187 |
| 2020/0094881 A1 * | 3/2020 | Mitsuo ................. | B62D 1/16 |
| 2020/0094883 A1 * | 3/2020 | Mitsuo ................. | B62D 1/16 |

FOREIGN PATENT DOCUMENTS

| | | |
|---|---|---|
| JP | 2012-46002 A | 3/2012 |
| JP | 2017-24471 A | 2/2017 |

\* cited by examiner

*Primary Examiner* — Kiran B Patel
(74) *Attorney, Agent, or Firm* — Hauptman Ham, LLP

(57) ABSTRACT

A D seat front beam has an inner end in a vehicle width direction fixed to a first column support point, and a point of fixation of the D seat front beam to the front lower pillar is provided further on a rear side in a vehicle front and rear direction than a first column support point. The D seat front beam extends toward an inner side in the vehicle width direction and toward the front side in the vehicle front and rear direction, from the point of fixation to the front lower pillar toward the first column support point.

4 Claims, 22 Drawing Sheets

CROSS-SECTIONAL VIEW TAKEN ALONG LINE G-G
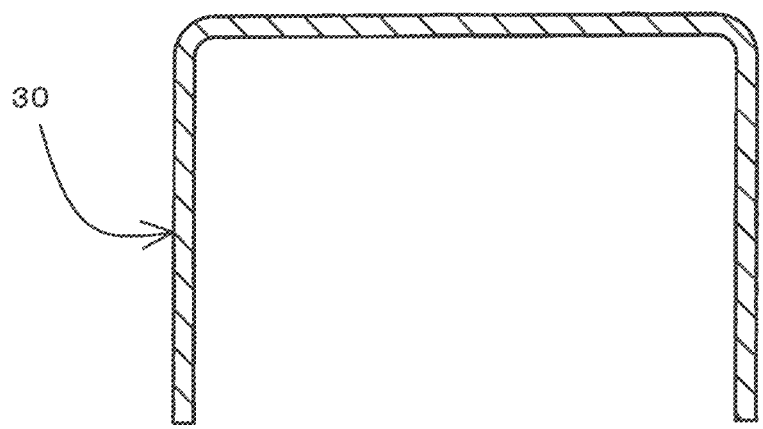
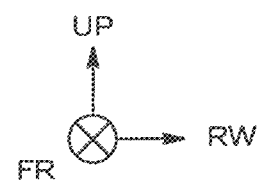
FIG. 4

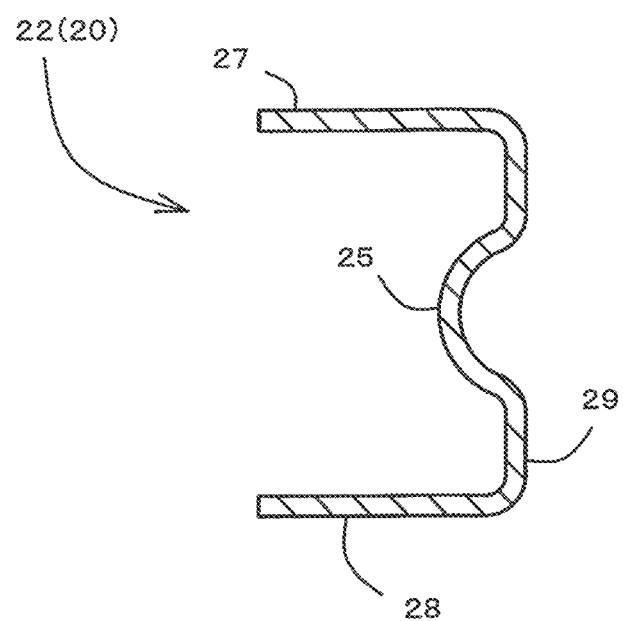
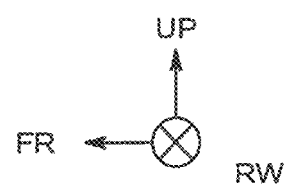
FIG. 5

CROSS-SECTIONAL VIEW TAKEN ALONG LINE B-B
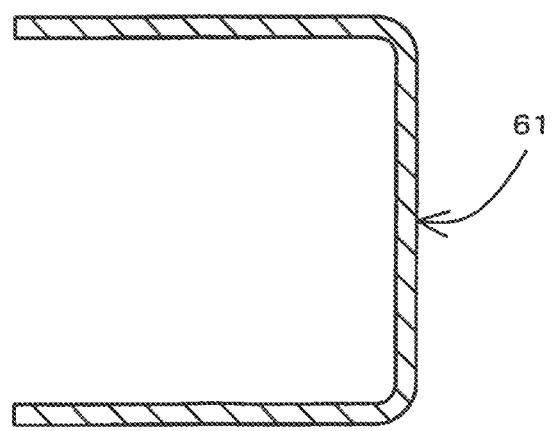
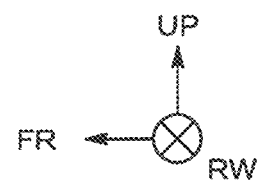
FIG. 13

CROSS-SECTIONAL VIEW TAKEN ALONG LINE C-C

CROSS-SECTIONAL VIEW TAKEN ALONG LINE D-D

STEERING SUPPORT STRUCTURE

CROSS REFERENCE TO RELATED APPLICATION

This application claims priority to Japanese Patent Application No. 2018-177179, filed on Sep. 21, 2018, which is incorporated herein by reference in its entirety.

TECHNICAL FIELD

The present disclosure relates to a steering support structure provided in a vehicle.

BACKGROUND

Vehicles are provided with an instrument panel reinforcement serving as a steering support structure for the vehicle. For example, FIG. 21 exemplarily illustrates an instrument panel reinforcement 200 disclosed in JP 2012-46002 A. The instrument panel reinforcement 200 is a pipe member extending in a vehicle width direction, and having both ends, in the vehicle width direction, fixed to frame members such as front pillars 202, 202.

A steering column 208 is attached to the instrument panel reinforcement 200 via a steering bracket 204 and steering braces 206 serving as holding members. A steering wheel 210 is provided at the rear end of the steering column 208 in a vehicle front and rear direction.

For example, the steering column 208 is supported at a plurality of points in the vehicle front and rear direction, to be provided with a tilt mechanism. For example, the steering bracket 204 has a rear end joined to the instrument panel reinforcement 200 and extends toward the front side in the vehicle front and rear direction from the joined portion. The steering braces 206 each have a front end joined to the instrument panel reinforcement 200 and extend toward the rear side in the vehicle front and rear direction from the joined portion.

The steering column 208 has a front portion, in the vehicle front and rear direction, rotatably supported by the steering bracket 204 via a tilt shaft bolt 214.

The steering column 208 has a rear portion, in the vehicle front and rear direction, supported by a movable bracket 218, and a fixed bracket 216 provided on the outer circumference of the movable bracket 218. The movable bracket 218 and the steering column 208 supported by the movable bracket 218 are movable in a vehicle upper and lower direction, relative to the fixed bracket 216. The fixed bracket 216 is supported by the steering braces 206 via rear bolts 212 and nuts (not illustrated).

With the support structure as described above, the steering column 208 enables the steering wheel 210 to move (tilt) up and down with the tilt shaft bolt 214 serving as the rotation center.

SUMMARY

A load in the vehicle width direction may be input from the steering wheel 210 during steering of the vehicle. This is the case, for example, when the vehicle makes a curve and forces the driver to hold the steering wheel 210 while resisting against the acceleration in a lateral acceleration (lateral G).

At this time, a load is input from the steering column 208 to the instrument panel reinforcement 200. Specifically, as illustrated in FIG. 22 as an example, a load F1 is input to the rear bolts 212, serving as a point of fastening of the steering braces 206 to the fixed brackets 216. Furthermore, a load F2 having a component opposite to the load F1 is input to the steering bracket 204 from the tilt shaft bolt 214, serving as a point of fastening of the steering column 208 to the steering bracket 204.

When this happens, the steering bracket 204 and the steering braces 206 act as so-called moment arms, and thus a so-called bending moment is input to the instrument panel reinforcement 200. This results in bending deformation of the instrument panel reinforcement 200 as indicated by broken lines in FIG. 22. This causes so-called inward deformation, with the steering bracket 204 and the steering brace 206 tilting to result in displacement of the steering wheel 210 toward the inner side in the vehicle width direction. The bending deformation of the instrument panel reinforcement 200 and the inward deformation of the steering wheel 210 compromise a so-called steering support rigidity.

An object of the present disclosure is to provide a steering support structure capable of achieving a higher steering support rigidity in the vehicle width direction than achieved in conventional configurations.

The present disclosure relates to a steering support structure. The structure includes an instrument panel reinforcement having both ends in a vehicle width direction fixed to frame members of a vehicle, and a steering bracket that is fixed to the instrument panel reinforcement and extends in a vehicle front and rear direction. The instrument panel reinforcement includes a D seat front beam, a D seat rear beam, and a P seat beam. The D seat front beam has an outer end in the vehicle width direction fixed to one of the frame members on a driver's seat side. The D seat rear beam is disposed further on a rear side in the vehicle front and rear direction than the D seat front beam, and has an outer end in the vehicle width direction fixed to one of the frame members on the driver's seat side. The P seat beam has an inner end in the vehicle width direction connected to an inner end in the vehicle width direction of the D seat rear beam and has an outer end in the vehicle width direction fixed to one of the frame members on a passenger's seat side. The steering bracket is fixed to the D seat rear beam and has a portion extending toward a front side in the vehicle front and rear direction from a point of fixation to the D seat rear beam, the portion being provided with a first column support point for supporting a steering column. The D seat front beam has an inner end in the vehicle width direction fixed to the first column support point, and a point of fixation of the D seat front beam to the frame member is provided further on a rear side in the vehicle front and rear direction than the first column support point. The D seat front beam extends toward an inner side in the vehicle width direction and toward the front side in the vehicle front and rear direction, from the point of fixation to the frame member toward the first column support point.

With this configuration, the load transfer path connecting the column support point with the instrument panel reinforcement, such as a steering bracket in conventional cases, is omitted. The load in the vehicle width direction input from the steering wheel to the first column support point is directly received (strut) by the D seat front beam, which is a member of the instrument panel reinforcement. Thus, a configuration to be a moment arm when a load in the vehicle width direction is input to the steering wheel is omitted. The D seat front beam extends toward the inner side in the vehicle width direction and toward the front side in the vehicle front and rear direction, to strut against inward deformation of the steering bracket. As a result, bending deformation of the instrument panel reinforcement can be more effectively suppressed as compared with conventional configurations.

Furthermore, in the above disclosure, the instrument panel reinforcement may include a grooved member having a squarish U-shaped cross section in a direction orthogonal to an extending direction.

With the above configuration, the grooved member having a squarish U-shaped cross section has a flat surface. Thus, the instrument panel reinforcement can be directly brought into contact with (surface alignment) and joined to a joining flat surface such as a flange of the brace. Thus, unlike in an instrument panel reinforcement formed of a pipe member having a cylindrical cross section, for example, this configuration requires no bracket serving as an intermediate member having an inner circumference surface joined to an outer circumference surface of the pipe member and a joining flat surface brought into contact with a flange or the like.

In the above disclosure, the D seat rear beam may be provided with a second column support point for supporting the steering column. In this case, a point of fixation of the D seat rear beam to the frame member is provided further on the front side in the vehicle front and rear direction than the second column support point. Furthermore, the D seat rear beam includes a first D seat rear beam that extends toward the inner side in the vehicle width direction and toward the rear side in the vehicle front and rear direction toward the second column support point from the point of fixation of the D seat rear beam to the frame member.

With this configuration, the steering column is supported at two portions in the vehicle front and rear direction with the second column support point on the rear side provided to the D seat rear beam. Thus, the D seat rear beam can directly receive (strut) a load in the vehicle width direction input from the steering column to the second column support point. Furthermore, the first D seat rear beam linearly extends toward the inner side in the vehicle width direction and toward the rear side in the vehicle front and rear direction, in such a manner as to strut against the outward deformation of the steering bracket in a direction opposite to the inward deformation.

Furthermore, in the above configuration, the point of fixation of the D seat front beam to the frame member and the point of fixation of the first D seat rear beam to the frame member may be disposed close to each other. In this case, the first D seat rear beam is formed to have a grooved shape with a squarish U-shaped cross section open toward the front side in the vehicle front and rear direction. Furthermore, the D seat front beam is formed to have a grooved shape with a squarish U-shaped cross section open toward the rear side in the vehicle front and rear direction. Furthermore, a closed cross section is formed with the first D seat rear beam and the D seat front beam overlapped with each other around the points of fixation to the frame member.

With this configuration, the D seat beam has a closed cross-sectional structure at the point of fixation to the frame member, and thus so-called attachment rigidity (torsion rigidity for example) of the D seat beam to the frame member can be improved.

With the present disclosure, a steering support structure capable of improving the steering support rigidity in the vehicle width direction can be provided.

BRIEF DESCRIPTION OF DRAWINGS

The present disclosure will be further described with reference to the accompanying drawings, wherein like reference numerals refer to like parts in the several views, and wherein:

FIG. 4 is a cross-sectional view taken along line G-G in FIGS. 2 and 3;

FIG. 5 is a cross-sectional view taken along line H-H in FIGS. 2 and 3;

FIG. 13 is a cross-sectional view taken along line B-B in FIG. 2;

DESCRIPTION OF EMBODIMENTS

Figure 1:
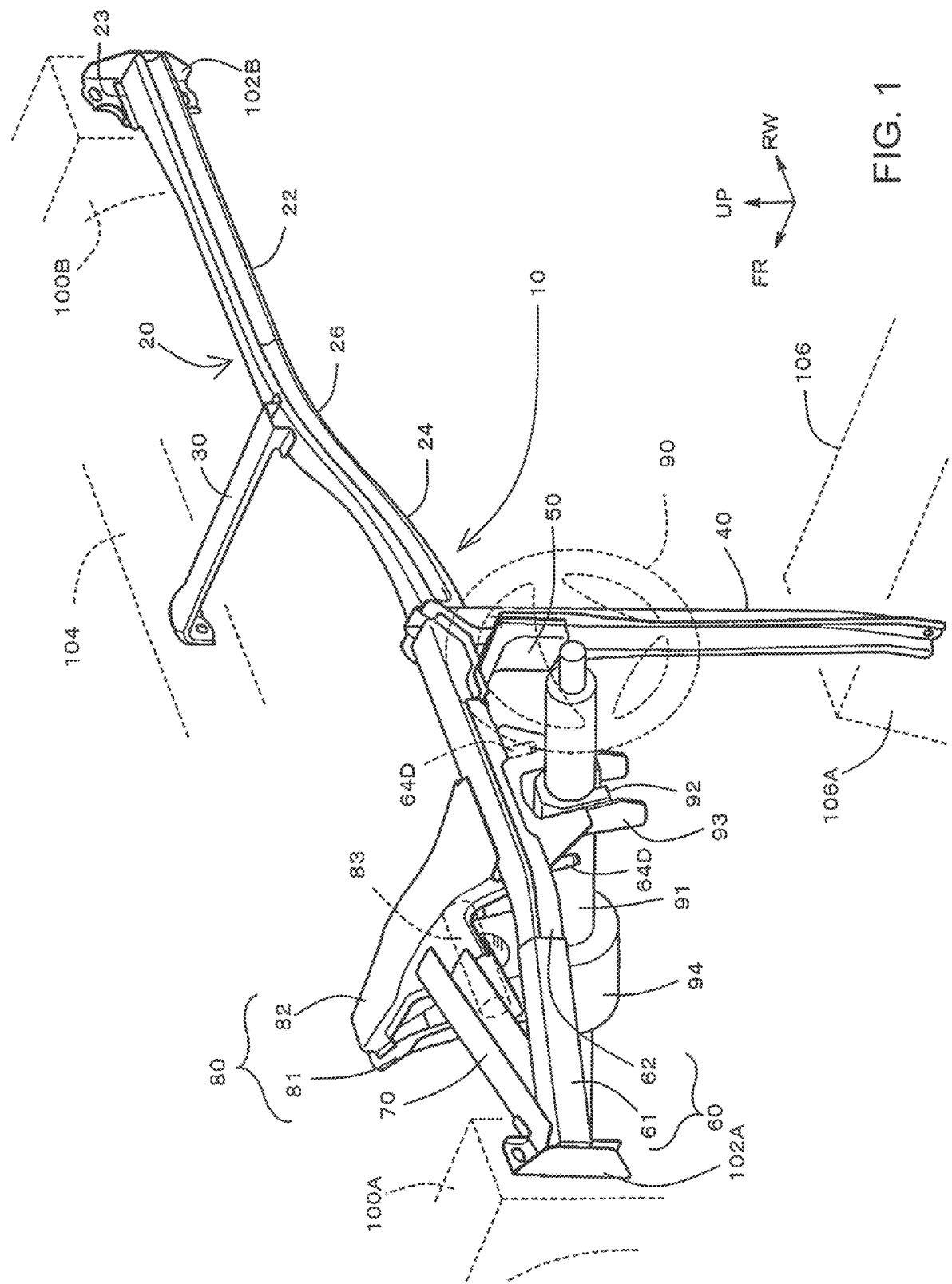
FIG. 1 is a diagram exemplarily illustrating a steering support structure according to the present embodiment.

FIG. 1 illustrates a steering support structure according to the present embodiment. In FIGS. 1 to 20, an axis denoted by a sign FR, an axis denoted by a sign RW, and an axis denoted by a sign UP respectively represents a front and rear direction, a width direction, and an upper and lower direction of a vehicle. The sign FR is an abbreviation of Front. A vehicle forward direction is assumed to be the positive direction on the vehicle longitudinal axis FR. The sign RW is an abbreviation of Right Width. A right width direction is assumed to be the positive direction on the vehicle width axis RW. An upward direction is assumed to be the positive direction on the vehicle upper and lower axis UP. As illustrated in FIG. 1, the vehicle longitudinal axis (FR axis), the vehicle width axis (RW axis), and the vehicle upper and lower axis (UP axis) are orthogonal to each other.

Figure 2:
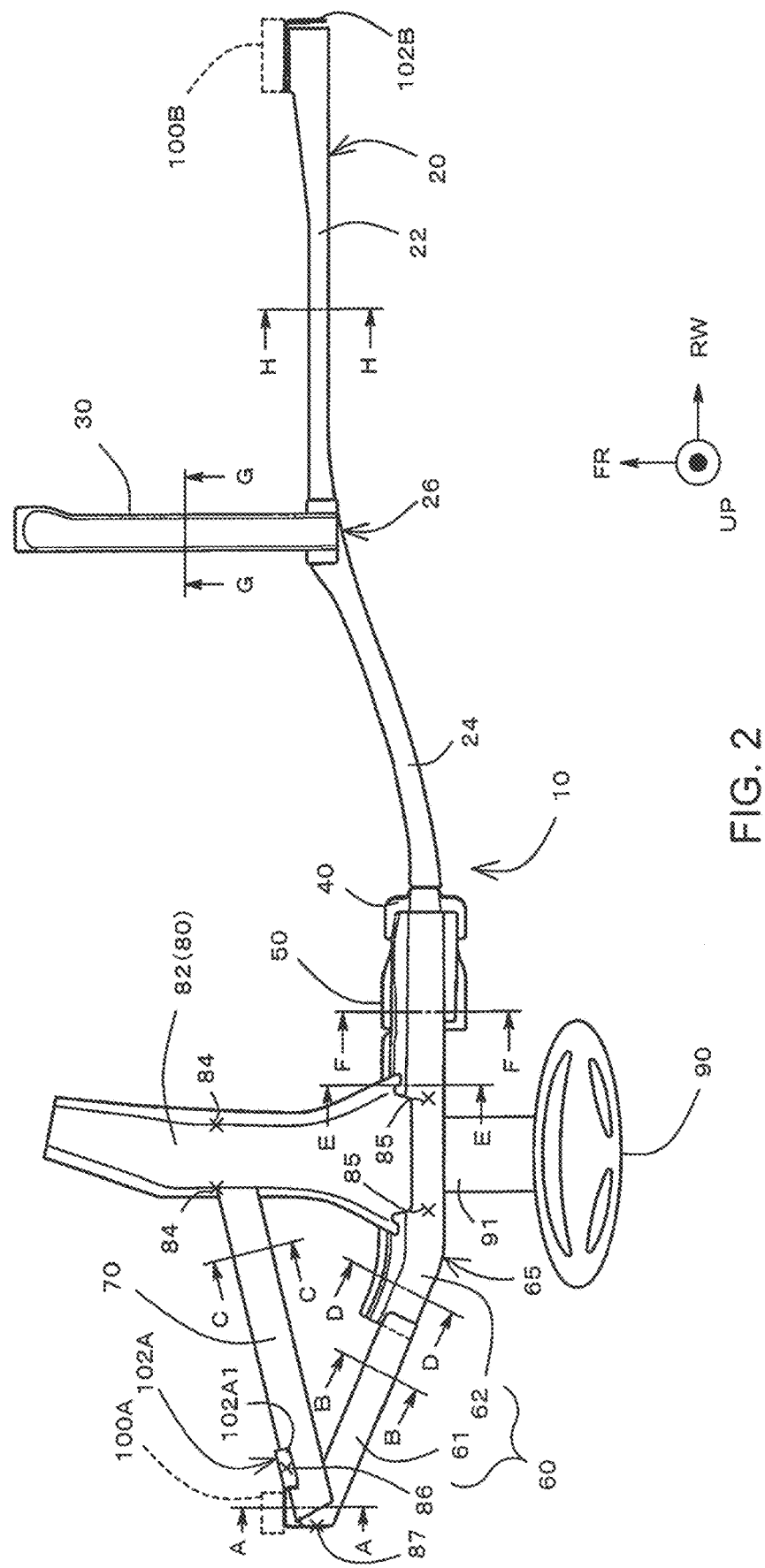
FIG. 2 is a plan view exemplarily illustrating the steering support structure according to the present embodiment.

FIG. 1 is a perspective view of a steering support structure for a left-hand drive vehicle, and FIG. 2 is a plan view of the same. An instrument panel separating a steering wheel 90 and the steering support structure from each other is omitted in the figure.

The steering support structure according to the present embodiment includes an instrument panel reinforcement 10, a steering bracket 80, a cowl to brace 30, and a floor brace 40.

The instrument panel reinforcement 10 according to the present embodiment supports a steering column 91, and has both ends, in the vehicle width direction, fixed to vehicle frame members. For example, the instrument panel reinforcement 10 has both ends, in the vehicle width direction, fastened to front lower pillars 100A and 100B, serving as the frame members, via front pillar brackets 102A and 102B. With both ends of the instrument panel reinforcement 10 in the vehicle width direction fixed to the frame members, the instrument panel reinforcement 10 mainly supports the steering column 91 in the vehicle width direction.

The instrument panel reinforcement 10 is fixed to the floor brace 40 and the cowl to brace 30. As described later, the instrument panel reinforcement 10 is supported by the floor brace 40 in the vehicle upper and lower direction. The instrument panel reinforcement 10 is supported by the cowl to brace 30 in the vehicle front and rear direction.

The instrument panel reinforcement 10 according to the present embodiment is not a single member such as a conventional tuboid pipe, and includes a plurality of members (parts). Specifically, the instrument panel reinforcement 10 includes a P seat beam 20, a D seat rear beam 60, a D seat front beam 70, and a gusset 50.

Referring to FIGS. 1 and 2, in the instrument panel reinforcement 10 according to the present embodiment, the D seat front beam 70 extends to a first column support point 84 of the steering bracket 80 from the front lower pillar 100A which is the frame member on the driver's seat side. As described later, the first column support point 84 is a support point at which the steering bracket 80 supports the steering column 91, and the load from the steering wheel 90 is input to the first column support point 84 via the steering column 91.

In the steering support structure according to the present embodiment, the D seat front beam 70 extends toward the first column support point 84, and directly receives a load in the vehicle width direction input from the first column support point 84. Thus, the configuration to become the moment arm such as a steering bracket in conventional configurations is omitted. Thus, the amount of the bending deformation of the instrument panel reinforcement 10, due to the load in the vehicle width direction input to the steering wheel 90, can be suppressed.

<Structure Around P Seat>

The structure around a passenger seat (P seat) of the instrument panel reinforcement 10 will be described with reference to FIGS. 3 to 5. The instrument panel reinforcement 10 includes the P seat beam 20 as a member around the P seat. In addition, the cowl to brace 30 is fixed to the P seat beam 20.

Referring to FIGS. 1, 2, 3 and 4, the cowl to brace 30 is a reinforcing member (brace) extending in the vehicle front and rear direction, and has a ridgeline, at which the load is mainly received (strut), extending substantially along the vehicle front and rear direction. The cowl to brace 30 has a front end fixed to a cowl panel 104 (see FIG. 1) serving as a panel member of the vehicle, and a rear end fixed to the P seat beam 20.

The brace member fixed to the P seat beam 20 may be a dash to brace instead of the cowl to brace 30. The dash to brace has a front end fixed to a dash panel (not shown) provided below the cowl panel 104 and extends toward the rear side in the vehicle front and rear direction to have a rear end fixed to the P seat beam 20.

FIG. 4 is an exemplary cross-sectional view taken along line G-G in FIG. 2. The cowl to brace 30 is a member having a squarish U-shaped cross section open toward the lower side in the vehicle upper and lower direction, and has a front flange 31 (see FIG. 3), facing the vehicle front and rear direction, formed at the front end. Rear flanges 32, 32 facing the vehicle upper and lower direction are formed at the rear end. The front flange 31 and the cowl panel 104 (see FIG. 1) are fastened to each other by fastening means such as a bolt and nut. The rear flanges 32, 32 and an upper wall portion 27 of the P seat beam 20 are joined to each other by welding or the like. In each cross-sectional view, the portion where joining by welding or the like takes place is indicated by hatching with vertical lines (∥∥).

Figure 3:
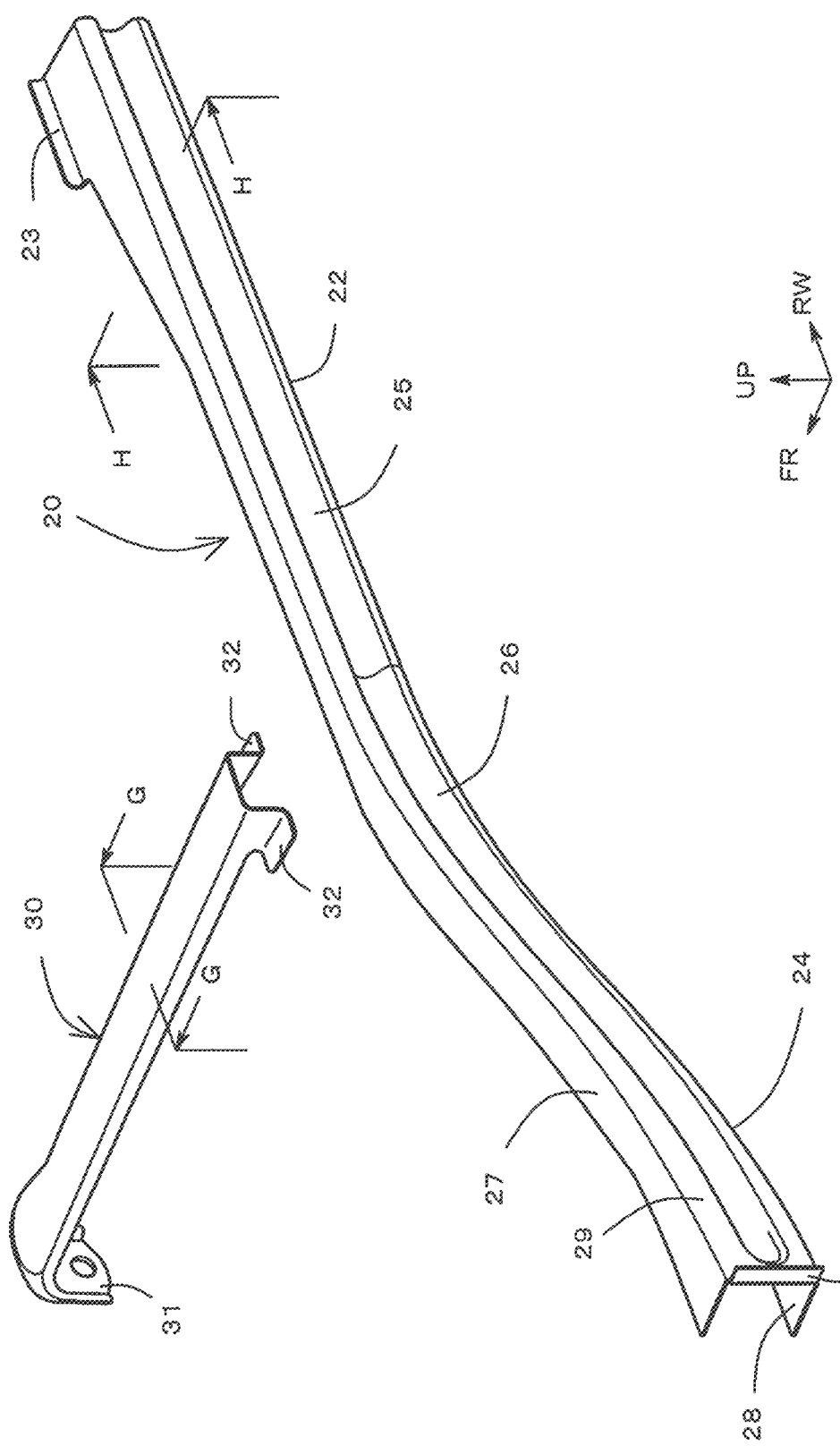
FIG. 3 is an exploded perspective view illustrating a P seat beam of an instrument panel reinforcement and a cowl to brace in the steering support structure according to the present embodiment.

Referring to FIG. 3, the P seat beam 20 extends substantially in the vehicle width direction, with a ridgeline, where a load is mainly received (strut), extending substantially in the vehicle width direction. FIG. 5 is an exemplary cross-sectional view taken along line H-H in FIGS. 2 and 3. The P seat beam 20 is a member having a squarish U-shaped cross section open toward the front side in the vehicle front and rear direction, and includes the upper wall portion 27 that extends in the vehicle front and rear direction and is provided on the upper side in the vehicle upper and lower direction, and a lower wall portion 28 that similarly extends in the vehicle front and rear direction and is provided on the lower side in the vehicle upper and lower direction. Furthermore, a side wall portion 29 is provided that extends in the vehicle upper and lower direction and connects the upper wall portion 27 and the lower wall portion 28 to each other. Referring to FIG. 3, a bead 25 is formed entirely over the side wall portion 29 in the vehicle width direction.

Referring to FIG. 3, an inner flange 21 facing the vehicle width direction is formed at an inner end portion of the side wall portion 29 of the P seat beam 20 in the vehicle width direction. The inner flange 21 is joined to a bottom wall portion 41 (see FIG. 6) of the floor brace 40 by welding or the like. Further referring to FIG. 7, inclined flanges 40A of the floor brace 40 and flanges 63D of an upper beam 63 of a second D seat rear beam 62 are joined to each other. Thus, the inner end portion of the P seat beam 20 in the vehicle width direction is connected to an inner end of the second D seat rear beam 62 in the vehicle width direction, via the floor brace 40.

Referring to FIG. 3, outer flanges 23 facing the vehicle front and rear direction are formed at outer end portions of the upper wall portion 27 and the lower wall portion 28 of the P seat beam 20 in the vehicle width direction. Referring to FIG. 1, the outer end of P seat beam 20 in the vehicle width direction is fixed to the front lower pillar 100B, which is the frame member on the passenger seat side, via the outer flanges 23 and the front pillar bracket 102B.

Referring to FIG. 2, the P seat beam 20 has a boomerang-like curved structure in plan view. Specifically, a side end portion 22 and an inclined portion 24 are respectively formed on the outer and the inner sides of the P seat beam 20 in the vehicle width direction. Furthermore, a bent portion 26 is formed in the P seat beam 20 to serve as a boundary part between the side end portion 22 and the inclined portion 24.

<Structure Around Floor Brace>

Figure 7:
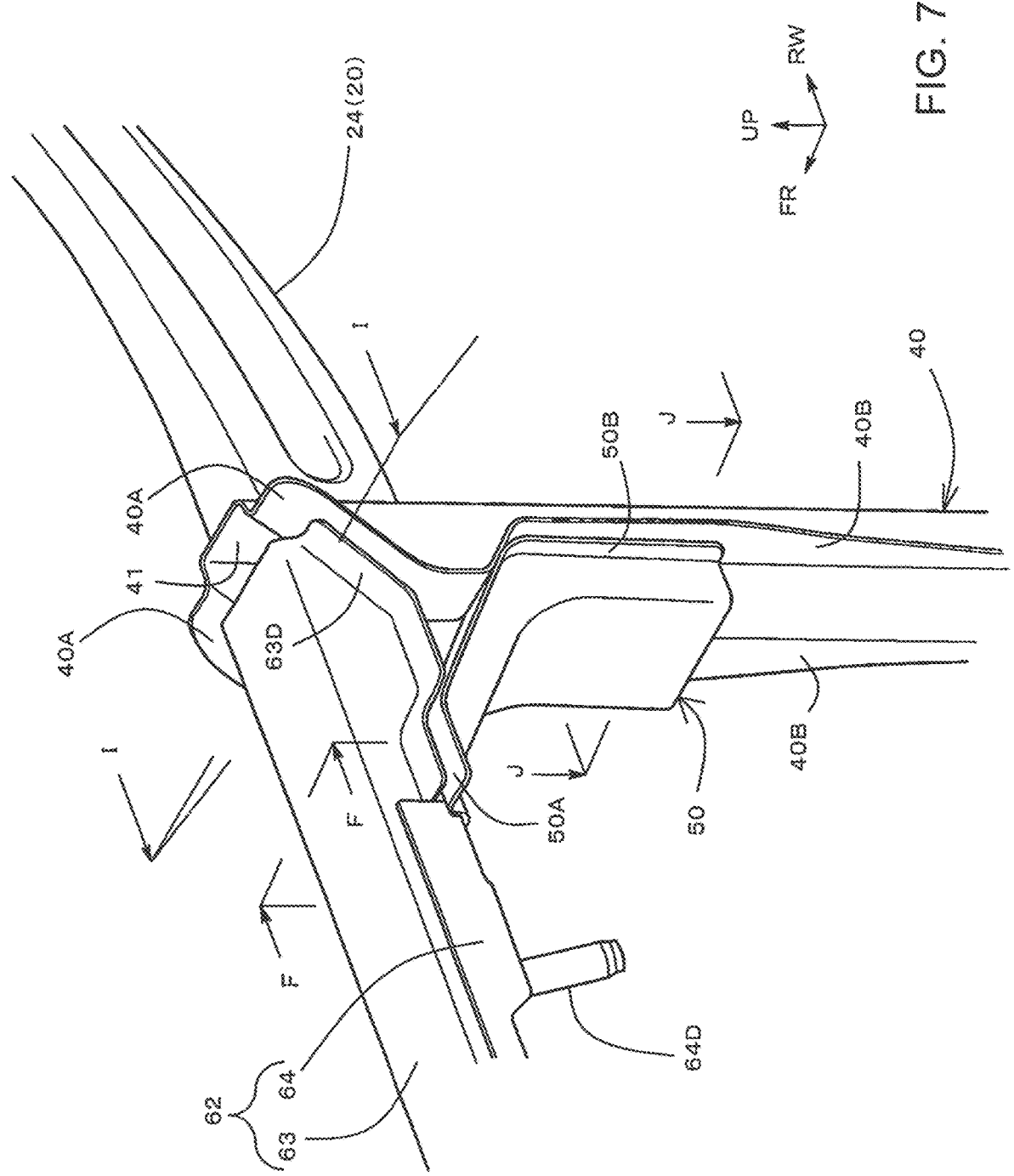
FIG. 7 is an enlarged perspective view exemplarily illustrating a portion where an upper beam of a second D seat rear beam, a floor brace, and a gusset in the steering support structure according to the present embodiment are joined to each other.

FIG. 7 illustrates an example of a structure around the upper end portion of the floor brace 40 in the vehicle upper and lower direction. The second D seat rear beam 62 has an end of the upper beam 63 in the vehicle width direction positioned further on the inner side than an end of a lower beam 64 in the vehicle width direction. Thus, the upper beam 63 projects toward the inner side beyond the lower beam 64 in the vehicle width direction.

The flanges 63D facing the lower side in with the vehicle upper and lower direction are formed in this projecting portion. The flanges 63D extend substantially in the vehicle width direction, and have outer portions, on the side away from the floor brace 40 (that is, closer to the gusset 50) in the vehicle width direction, joined to upper flanges 50A of the gusset 50. Furthermore, the flanges 63D have inner side portions, on the side closer to the floor brace 40 in the vehicle width direction, inclined to extend in the vehicle width direction and in the vehicle upper and lower direction. These inclined portions are joined to the inclined flanges 40A of the floor brace 40.

Figure 8:
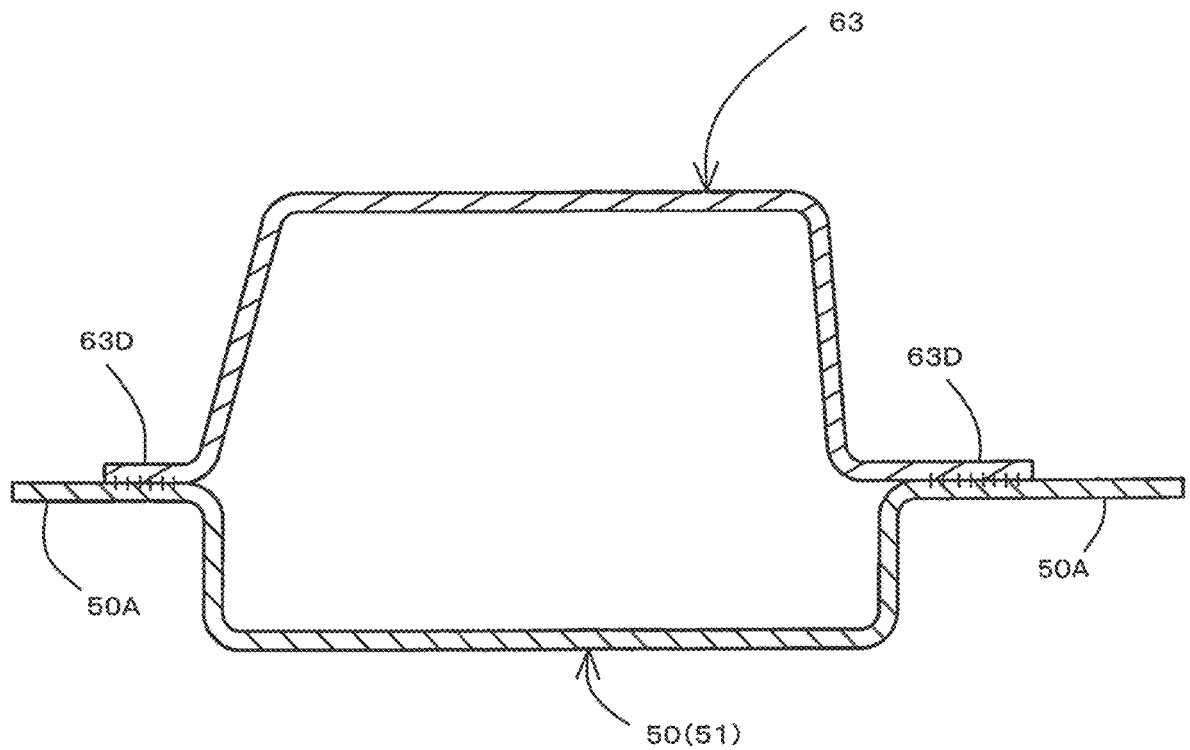
FIG. 8 is a cross-sectional view taken along line F-F in FIGS. 2 and 7.

FIG. 8 is an exemplary cross-sectional view taken along line F-F in FIGS. 2 and 7. As illustrated in this figure, a closed cross-sectional structure is formed with the gusset 50 and the upper beam 63 joined to each other at the upper flanges 50A and the flanges 63D. The gusset 50 has a hat-shaped cross section open toward the upper side. The upper beam 63 has a hat-shaped cross section open toward the lower side.

Figure 9:
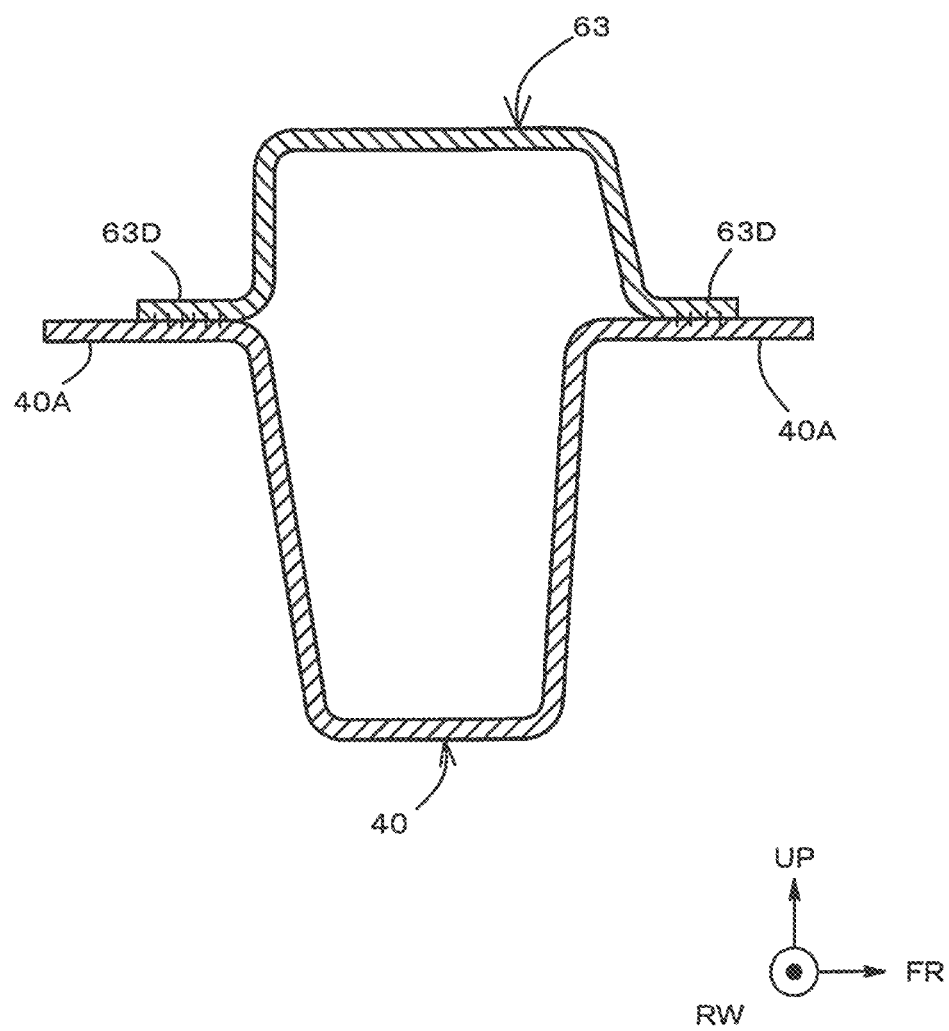
FIG. 9 is a cross-sectional view taken along line I-I in FIG. 7.

FIG. 9 is a similar exemplary cross-sectional view taken along line I-I in FIG. 7. As shown in this figure, a closed cross-sectional structure is formed with the floor brace 40 and the upper beam 63 joined to each other at the inclined flanges 40A and the flanges 63D. The floor brace 40 has a hat-shaped cross section open toward the upper side. The upper beam 63 has a hat-shaped cross section open toward the lower side.

Figure 6:
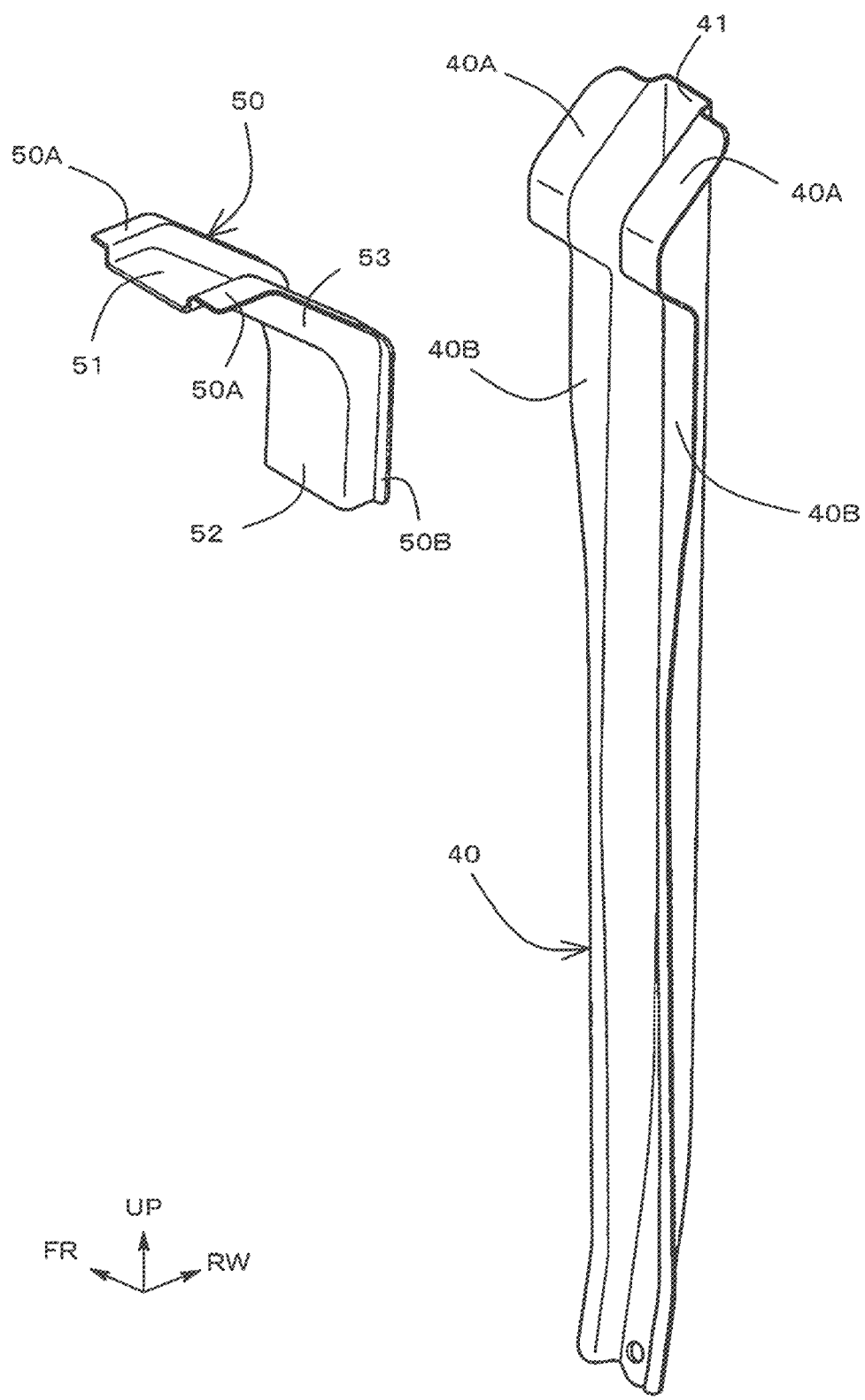
FIG. 6 is an exploded perspective view illustrating a floor brace and a gusset in the steering support structure according to the present embodiment.

FIG. 6 is a perspective view of the floor brace 40 and the gusset 50. Referring to FIG. 1, the floor brace 40 is a reinforcing member extending in the vehicle upper and lower direction, and has a ridgeline, where a load is mainly received (strut), extending in the vehicle upper and lower direction. The floor brace 40 has an upper end fixed to the upper beam 63 of the second D seat rear beam 62 and the P seat beam 20. The floor brace 40 has a lower end fixed to a side wall 106A of a floor tunnel 106.

Referring to FIGS. 6 and 7, the floor brace 40 has the upper end in the vehicle upper and lower direction formed to be projected in the vehicle width direction, and the inclined flanges 40A, 40A are formed along its ridgeline. Furthermore, vertical flanges 40B, 40B that face the vehicle width direction and extend in the vehicle upper and lower direction are formed further on the lower side than the projecting portion in the vehicle upper and lower direction.

The gusset 50 is a member for reinforcing the support structure including the upper beam 63 and the floor brace 40, and includes a horizontal portion 51 extending in the vehicle width direction, a vertical portion 52 extending in the vehicle upper and lower direction, and an inclined portion 53 that is provided between these portions and is inclined to extend in the vehicle width direction and in the vehicle upper and lower direction. Each of the horizontal portion 51, the vertical portion 52, and the inclined portion 53 is formed to have a hat-shaped cross section.

Figure 10:
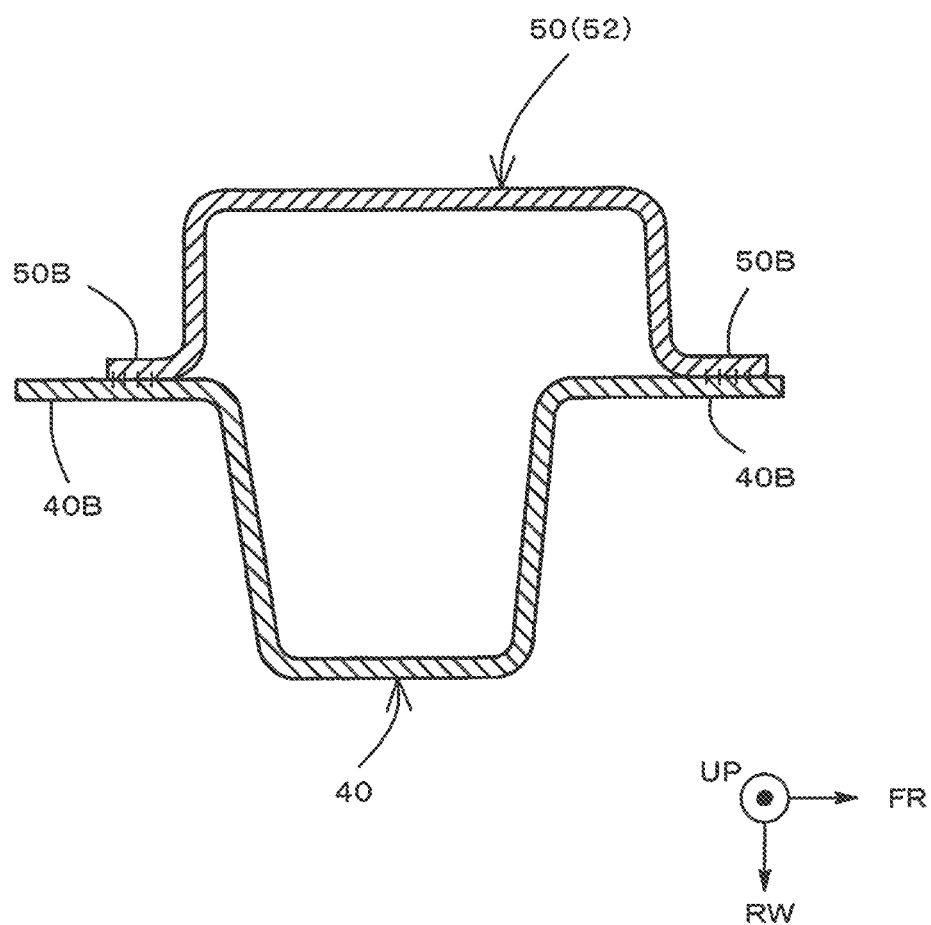
FIG. 10 is a cross-sectional view taken along line J-J in FIG. 7.

As described above, the upper flanges 50A, 50A of the horizontal portion 51 are joined to the flanges 63D, 63D of the upper beam 63 of the second D seat rear beam 62. FIG. 10 is an exemplary cross-sectional view taken along line J-J in FIG. 7. Referring to this, the vertical portion 52 of the gusset 50 and the floor brace 40 are overlapped and joined to each other at the lower flanges 50B and 50B and the vertical flanges 40B and 40B. The vertical portion 52 of the gusset 50 has a hat-shaped cross section open toward the left side in the vehicle width direction. The floor brace 40 has a hat-shaped cross section open toward the right side in the vehicle width direction. Thus, a closed cross-sectional structure is formed.

<Structure Around D Seat>

A structure of the instrument panel reinforcement 10 around the driver's seat (D seat) will be described with reference to FIG. 1, FIG. 2, and FIG. 11 to FIG. 18. The instrument panel reinforcement 10 includes the D seat rear beam 60 and the D seat front beam 70 as members around the D seat. The D seat rear beam 60 is provided further on the rear side than the D seat front beam 70 in the vehicle front and rear direction.

Figure 11:
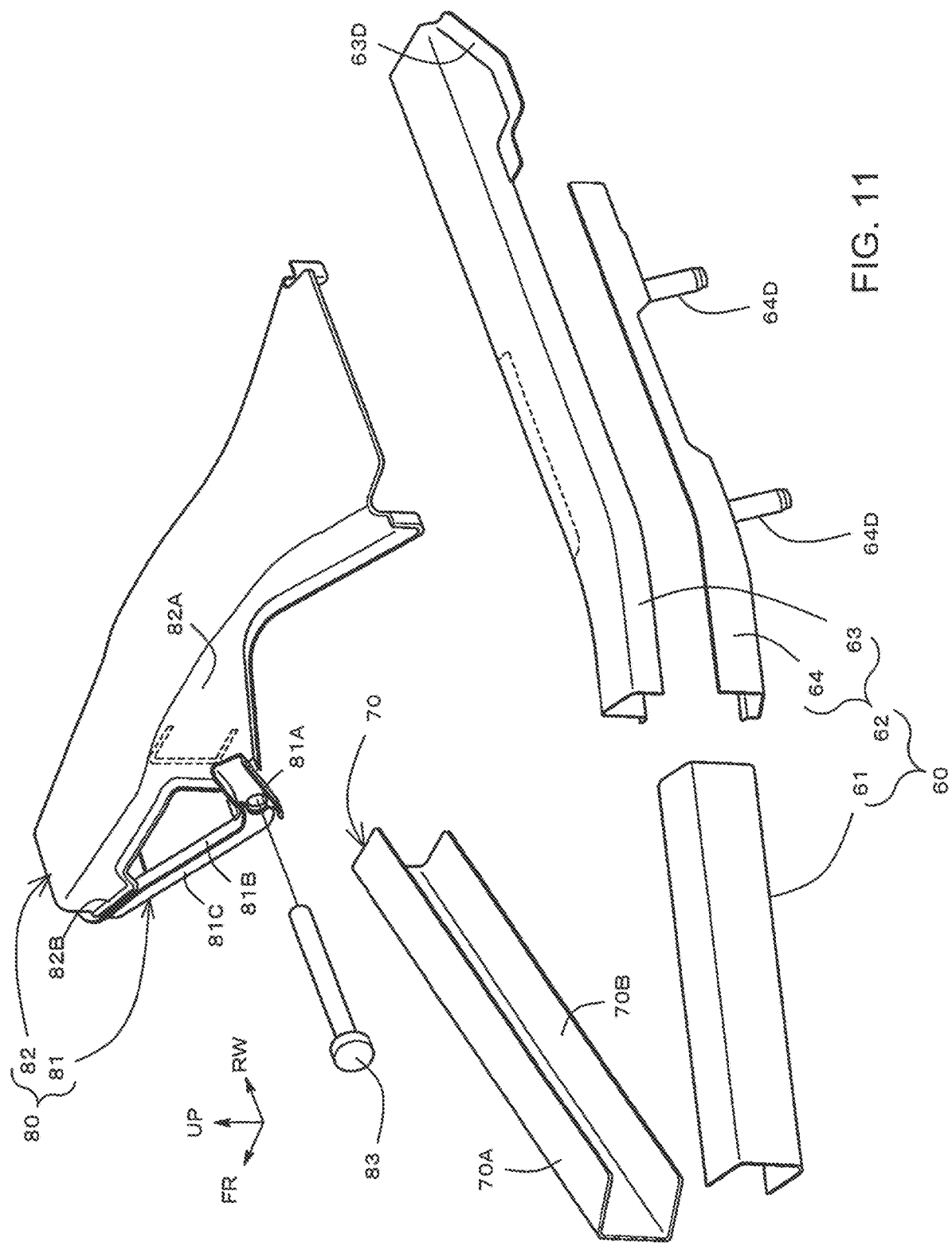
FIG. 11 is an exploded perspective view exemplarily illustrating members forming a D seat beam and a steering bracket in the instrument panel reinforcement according to the present embodiment.

Referring to FIGS. 1, 2 and 11, the D seat rear beam 60 includes a first D seat rear beam 61 and a second D seat rear beam 62. The first D seat rear beam 61 is provided further on the outer side than the second D seat rear beam 62 in the vehicle width direction.

The first D seat rear beam 61 has an end in the vehicle width direction fixed to the front lower pillar 100A, which is the frame member on the driver's seat side, via the front pillar bracket 102A. A point of fixation 87 between the outer end of the first D seat rear beam 61 in the vehicle width direction and the front lower pillar 100A is provided on the front pillar bracket 102A regarded as a part of the front lower pillar 100A. Referring to FIG. 2, the point of fixation 87 is provided further on the front side than the second column support point 85 in the vehicle front and rear direction.

The inner end of the first D seat rear beam 61 in the vehicle width direction is connected to the outer end of the second D seat rear beam 62 in the vehicle width direction. For example, the inner end portion of the first D seat rear beam 61 in the vehicle width direction is overlapped on and joined to the outer end portion of the second D seat rear beam 62 in the vehicle width direction by welding or the like.

The first D seat rear beam 61 is disposed obliquely in plan view. More specifically, the first D seat rear beam 61 extends from the outer end in the vehicle width direction joined to the front lower pillar 100A to the inner end in the vehicle width direction; that is, extends toward the inner side in the vehicle width direction and toward the rear side in the vehicle front and rear direction toward the second column support point 85 from the point of fixation 87. In this manner, the first D seat rear beam 61 extends linearly from the point of fixation 87 toward the second column support point 85.

FIG. 13 is an exemplary cross-sectional view taken along line B-B in FIG. 2. The first D seat rear beam 61 is formed of a grooved member having a squarish U-shaped cross section opened toward the front side in the vehicle front and rear direction. The grooved member having the squarish U-shaped cross section has a flat surface. Thus, a joining flat surface such as a flange of the front pillar bracket can be brought into direct contact with (face alignment) and joined to the first D seat rear beam 61. Unlike in an instrument panel reinforcement formed of a pipe member having a cylindrical cross section, for example, this configuration requires no bracket serving as an intermediate member having an inner circumference surface joined to an outer circumference surface of the pipe member and a joining flat surface joined to a flange or the like.

Referring to FIGS. 1, 2 and 11, the second D seat rear beam 62 is connected to the inner end of the first D seat rear beam 61 in the vehicle width direction and extends in the vehicle width direction. Specifically, the second D seat rear beam 62 is provided with a bent portion 65 (see FIG. 2) that is further on the inner side than the outer end portion in the vehicle width direction joined to the inner end of the first D seat rear beam 61 in the vehicle width direction. The second D seat rear beam 62 extends from the bent portion 65 in the vehicle width direction. Referring to FIGS. 1, 2 and 11, stud bolts 64D, 64D are provided at this portion extending in the vehicle width direction.

Referring to FIG. 1, a fixed bracket 93 attached to the steering column 91 is fastened to the stud bolts 64D, 64D. The stud bolts 64D, 64D are inserted into openings (not illustrated) formed in the fixed bracket 93. The fixed bracket 93 is supported and fixed on the second D seat rear beam 62 via the stud bolts 64D, 64D, with nuts (not illustrated) screwed onto shaft ends of the stud bolts 64D, 64D. As a result, portions where the stud bolts 64D, 64D are provided serve as the second column support points 85 (see FIG. 2) for supporting the steering column 91.

Figure 15:
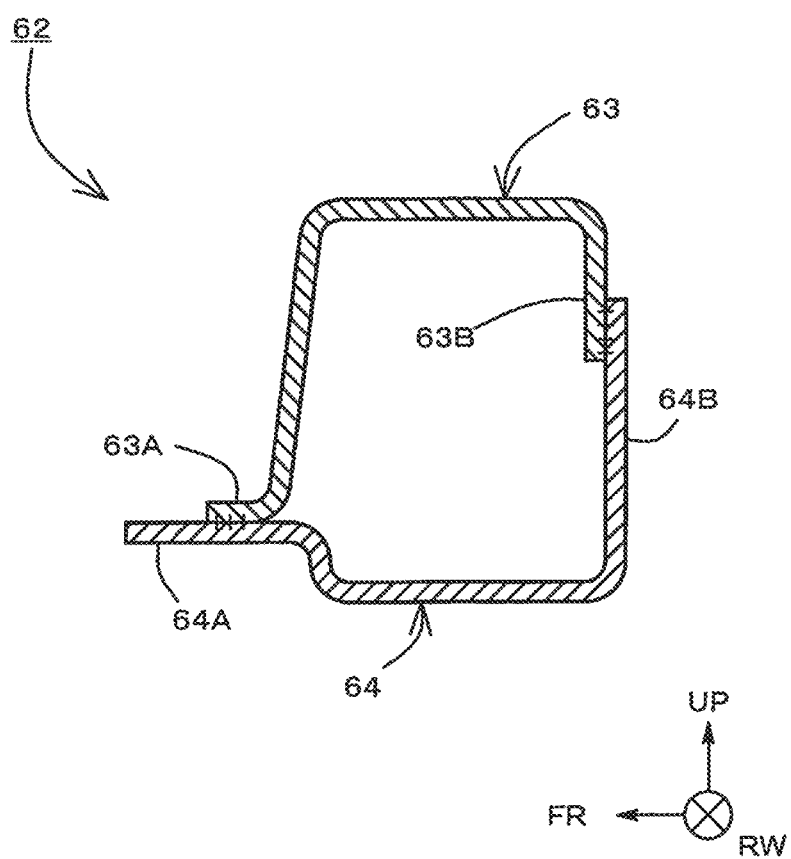
FIG. 15 is a cross-sectional view taken along line D-D in FIG. 2.

Referring to FIG. 11, the second D seat rear beam 62 includes the upper beam 63 which is an upper member and the lower beam 64 which is a lower member. FIG. 15 is an exemplary cross-sectional view taken along line D-D in FIG. 2. The upper beam 63 is formed in a substantially squarish U shape open toward the lower side in the vehicle upper and lower direction. Furthermore, the flange 63A for joining is formed on the front side of the upper beam 63 in the vehicle front and rear direction. The lower beam 64 is formed in a substantially sharish U shape open toward the upper side in the vehicle upper and lower direction. Furthermore, the flange 64A for joining is formed on the front side of the lower beam 64 in the vehicle front and rear direction.

The flange 63A of the upper beam 63 and the flange 64A of the lower beam 64 are overlapped and joined to each other by welding or the like. Furthermore, a rear wall 63B of the upper beam 63 and a rear wall 64B of the lower beam 64 are overlapped and joined to each other by welding or the like. Thus, the second D seat rear beam 62 has a closed cross-sectional structure.

Figure 16:
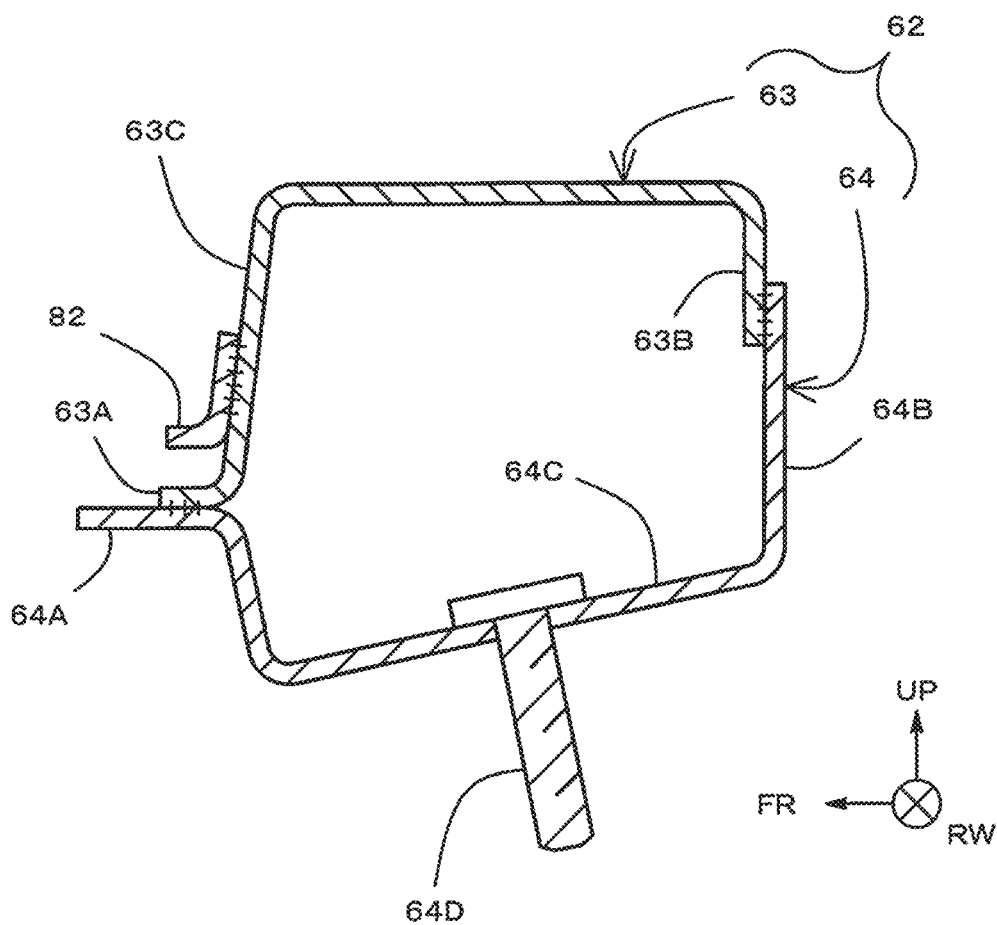
FIG. 16 is a cross-sectional view taken along line E-E in FIG. 2.

FIG. 16 is an exemplary cross-sectional view (cross-sectional view taken along line E-E in FIG. 2) of a portion of the second D seat rear beam 62 extending in the vehicle width direction. The steering upper bracket 82 has a rear end portion joined to a front wall 63C of the upper beam 63 by welding or the like. Furthermore, the stud bolt 64D is provided through a lower wall 64C of the lower beam 64.

Thus, the second D seat rear beam 62 is provided with the stud bolts 64D, 64D to be provided with the second column support points 85, 85 (see FIG. 2) for the steering column 91, and has a closed cross-sectional shape. This configuration can achieve a higher support rigidity for the steering wheel 90 and the steering column 91, as compared with a configuration where the second D seat rear beam 62 has an open cross-sectional shape.

In addition, as described later, with the second column support points 85, 85 provided to the D seat rear beam 60, bending deformation of the instrument panel reinforcement 10 in response to an input of a load in the vehicle width direction from the steering wheel 90 can be suppressed.

Specifically, the load in the vehicle width direction input from the steering wheel 90 is transmitted from the second column support points 85, 85 to the second D seat rear beam 62 via the steering column 91. Then, the second D seat rear beam 62 extending in the vehicle width direction directly receives (struts) the load in the vehicle width direction input from the second column support points 85, 85, so that generation of a bending moment can be suppressed. As a result, bending deformation of the instrument panel reinforcement 10 including the second D seat rear beam 62 is suppressed.

The D seat front beam 70 has an outer side end in the vehicle width direction fixed to the front lower pillar 100A, serving as the frame member on the driver's seat side, via the front pillar bracket 102A. For example, as illustrated in FIG. 2, a flange 102A1 of the front pillar bracket 102 is joined to the top wall 70A and the bottom wall 70B (see FIG. 11) of the D seat front beam 70. A point of fixation 86 between the outer end of the D seat front beam 70 in the vehicle width direction and the front lower pillar 100A is provided on the flange 102A1 of the front pillar bracket 102A regarded as a part of the front lower pillar 100A. The point of fixation 86 is provided further on the rear side than the first column support point 84 in the vehicle front and rear direction.

Furthermore, the D seat front beam 70 has an inner end in the vehicle width direction fixed to a side wall 82A (see FIG. 11) of the steering upper bracket 82. For example, as indicated by the broken line on the side wall 82A, the inner end of the D seat front beam 70 in the vehicle width direction comes into contact with and is joined to the side wall 82A of the steering upper bracket 82 by fillet welding or the like.

Figure 12:
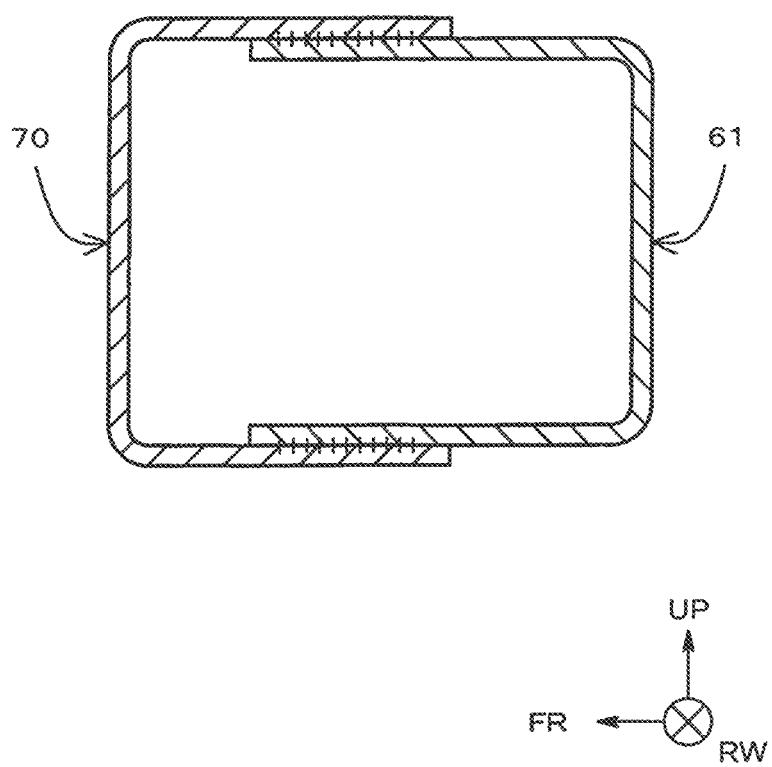
FIG. 12 is a cross-sectional view taken along line A-A in FIG. 2.
Figure 14:
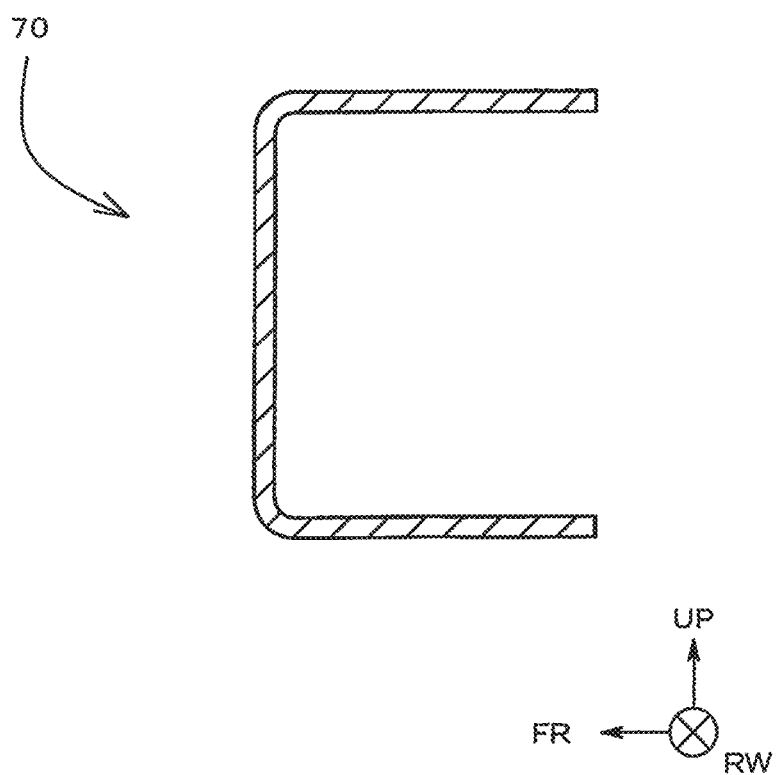
FIG. 14 is a cross-sectional view taken along line C-C in FIG. 2.

FIG. 14 is a cross-sectional view taken along line C-C in FIG. 2. Referring to this figure, the D seat front beam 70 is formed of a grooved member having a squarish U-shaped cross section open toward the rear side in the vehicle front and rear direction. FIG. 12 is a cross-sectional view taken along line A-A in FIG. 2. As illustrated in FIG. 2, the point of fixation 86 between the D seat front beam 70 and the front lower pillar 100A, and the point of fixation 87 between the first D seat rear beam 61 and the front lower pillar 100A are disposed close to each other. Around these points of fixation 86 and 87, the outer end portion of the D seat front beam 70 in the vehicle width direction and the outer end portion of the first D seat rear beam 61 in the vehicle width direction are overlapped and joined to each other by welding or the like. As described above, the D seat front beam 70 is formed to have a grooved shape with a squarish U-shaped cross section open toward the rear side in the vehicle front and rear direction. Furthermore, the first D seat rear beam 61 is formed to have a grooved shape with a squarish U-shaped cross section open toward the front side in the vehicle front and rear direction. A closed cross section is formed with these members overlapped and joined to each other around the points of fixation 86 and 87 to the front lower pillar 100A.

As described above, the closed cross-sectional structure is provided in the outer end portions of the D seat rear beam 60 and the D seat front beam 70, joined to the front lower pillar 100A serving as a frame member of the vehicle, in the vehicle width direction. Thus, the mounting rigidity of the instrument panel reinforcement 10 with respect to the front lower pillar 100A is improved. For example, with the closed cross-sectional structure, torsional deformation of the outer end portion s of the D seat rear beam 60 and the D seat front beam 70 in the vehicle width direction relative to the front lower pillar 100A can be reduced.

Referring to FIG. 2, the D seat front beam 70 is obliquely arranged in plan view. More specifically, the D seat front beam 70 extends from the outer end portion in the vehicle width direction to the inner end portion in the vehicle width direction; that is, extends toward the inner side in the vehicle width direction and toward the front side in the vehicle front and rear direction toward the first column support point 84 from the point of fixation 86. In addition, the ridgeline of the D seat front beam 70, where a load is mainly received (strut), linearly and obliquely extends toward the inner side in the vehicle width direction and toward the rear side in the vehicle front and rear direction; that is, extends between the point of fixation 86 and the first column support point 84 by the shortest distance.

Referring to FIGS. 1, 2 and 11, the inner end of D seat front beam 70 in the vehicle width direction comes into contact with and is joined to the side wall 82A of steering upper bracket 82. The point of this joining is provided at a position close to a tilt shaft opening 81A of the steering lower bracket 81, as indicated by the broken line in FIG. 11.

A tilt shaft bolt 83 is inserted into the tilt shaft opening 81A. As described later, the steering column 91 is rotatably supported by the steering bracket 80 via the tilt shaft bolt 83. More specifically, referring to FIG. 2, first column support points 84, 84 are formed at a portion where the tilt shaft bolt 83 is inserted into the steering bracket 80.

The D seat front beam 70 extends toward the first column support points 84, 84. Such a structure can suppress the bending deformation of the instrument panel reinforcement 10 due to the input of a load from the steering wheel 90 in the vehicle width direction, as described later.

Specifically, the load in the vehicle width direction input from the steering wheel 90 is transmitted from the first column support points 84, 84 to the D seat front beam 70 via the steering column 91. Then, the D seat front beam 70 extending in the vehicle width direction directly receives (struts) the load in the vehicle width direction input from the first column support points 84, 84, so that generation of a bending moment can be suppressed. As a result, bending deformation of the instrument panel reinforcement 10 including the D seat front beam 70 is suppressed.

As described above, in the instrument panel reinforcement 10 according to the present embodiment, the D seat front beam 70 extends toward the first column support point 84 which is the support point for the steering column 91. Furthermore, the D seat rear beam 60 extends toward the second column support point 85. This configuration is free of the configuration that serves as a moment arm unlike in the configuration where a load is transmitted to the instrument panel reinforcement 10 from the first column support point 84 and the second column support point 85 via a bracket and a brace. As a result, the generation of the bending moment is suppressed and the bending deformation of the instrument panel reinforcement 10 is suppressed.

Furthermore, the D seat front beam 70 and the D seat rear beam 60 respectively extend toward the first column support point 84 and the second column support point 85, while having their outer ends in the vehicle width direction overlapped. Thus, the D seat front beam 70 and the D seat rear beam 60 are arranged to be more separated from each other in the vehicle front and rear direction at a portion more on the inner side in the vehicle width direction, to be in a V-shaped structure for supporting the steering column 91.

Figure 17:
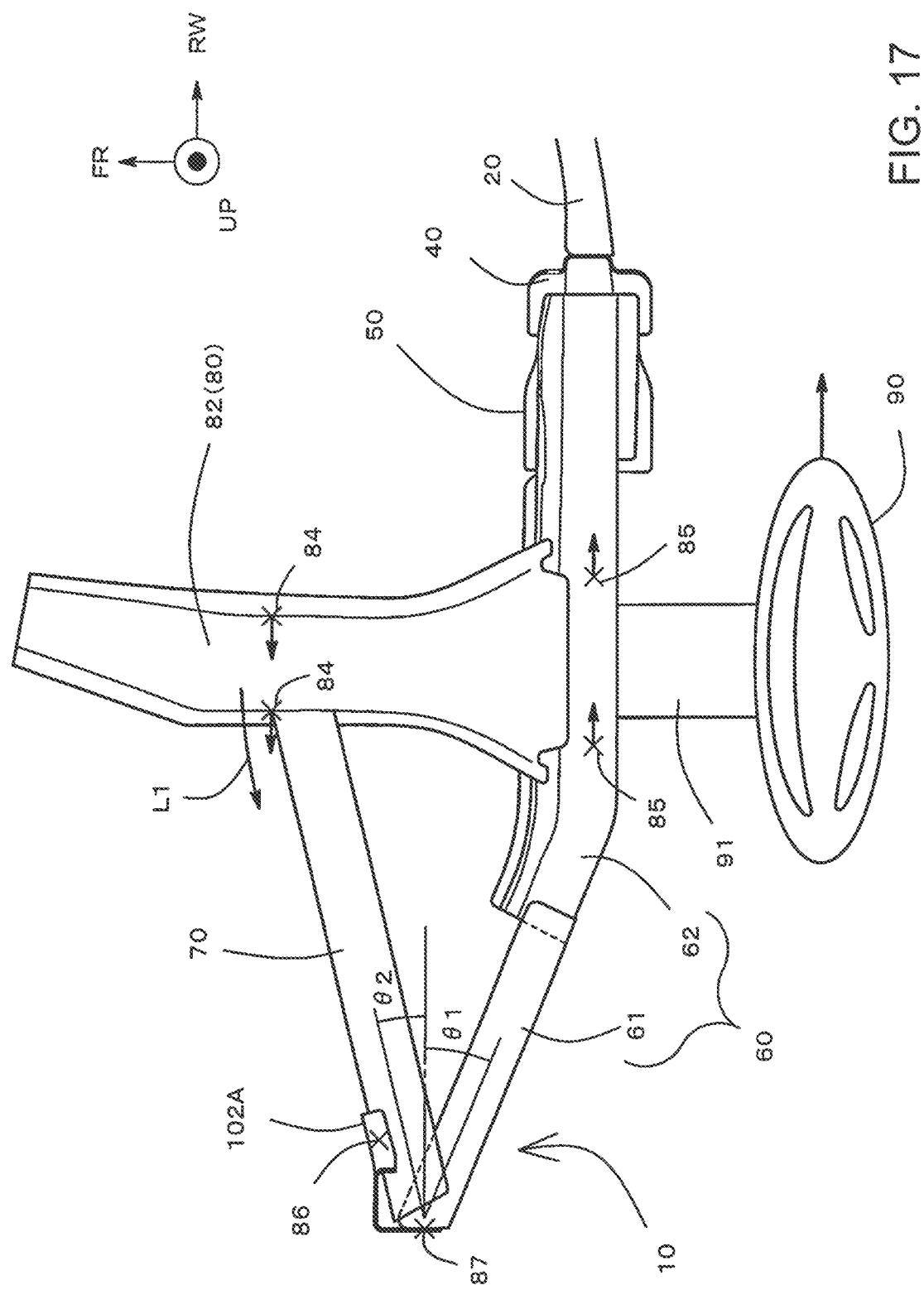
FIG. 17 is a plan view illustrating a transfer path of a load in a right direction input from the steering wheel to the instrument panel reinforcement according to the present embodiment.

Referring to FIG. 2, with such a V-shaped structure, the D seat front beam 70 linearly extends toward the inner side in the vehicle width direction and toward the front side in the vehicle front and rear direction, in such a manner as to strut against the inward deformation of the steering bracket 80 (see curved arrow L1 in FIG. 17). Furthermore, the first D seat rear beam 61 linearly extends toward the inner side in the vehicle width direction and toward the rear side in the vehicle front and rear direction, in such a manner as to strut against the outward deformation of the steering bracket 80 in a direction opposite to the inward deformation (see curved arrow L2 in FIG. 18). As a result, bending deformation of the instrument panel reinforcement can be more effectively suppressed as compared with conventional configurations.

Referring to FIG. 17, how inclination angles of the D seat front beam 70 and the D seat rear beam 60 in plan view are set for establishing the V-shaped structure will be described. FIG. 17 illustrates an inclination angle θ1 of the first D seat rear beam 61 with respect to the vehicle width direction axis (RW axis) and an inclination angle θ2 of the D seat front beam 70 with respect to the vehicle width direction axis.

For example, angle θ1=angle θ2 may hold true so that the instrument panel reinforcement 10 can have the same load capacity against a load toward the right side in the vehicle width direction input to the steering wheel 90 and a load toward the left side in the vehicle width direction input.

<Steering Bracket>

FIG. 11 is an exemplary perspective view of the steering bracket 80. The steering bracket 80 is a support member that is fixed to the instrument panel reinforcement 10 and extends in the vehicle front and rear direction. As exemplarily illustrated in FIG. 2, the steering bracket 80 has the rear side in the vehicle front and rear direction fixed to the second D seat rear beam 62. For example, as exemplarily illustrated in FIG. 2, the steering bracket 80 has the rear end in the vehicle front and rear direction fixed to the second D seat rear beam 62. The steering bracket 80 extends toward the front side in the vehicle front and rear direction from the point of fixation to the second D seat rear beam 62. Furthermore, this extended portion is provided with the first column support points 84 and 84 for supporting the steering column 91.

The steering bracket 80 includes a steering lower bracket 81 which is a lower member and a steering upper bracket 82 which is an upper member. The steering upper bracket 82 is a reinforcing member extending substantially in the vehicle front and rear direction.

The rear end of the steering upper bracket 82 in the vehicle front and rear direction is joined to the second D seat rear beam 62 as exemplarily indicated by the broken line on the upper beam 63 in FIG. 11 or in FIG. 16 that is a cross-sectional view taken along line E-E in FIG. 2. For example, the steering upper bracket 82 is a member having a squarish U-shaped cross section open toward the lower side, and the inner end of the D seat front beam 70 in the vehicle width direction comes into contact with and is joined to the side walls 82A, 82A opposed in the vehicle width direction.

The steering lower bracket 81 is joined to the steering upper bracket 82 by welding or the like. For example, a flange 82B provided at the front end of the steering upper bracket 82 and a flange 81B provided at the front end of the steering lower bracket 81 are joined to each other by welding.

For example, the steering lower bracket 81 is a member having a squarish U-shaped cross section open toward the upper side. The rear ends of side walls 81C, 81C, facing the vehicle width direction, are joined to the side walls 82A, 82A of the steering upper bracket 82.

In addition, the tilt shaft opening 81A is formed in the side walls 81C, 81C of the steering lower bracket 81. The tilt shaft opening 81A is a through hole formed through the side walls 81C, 81C in the thickness direction (in the vehicle width direction).

Referring to FIG. 1, a power steering mechanism 94 is provided on the front side of the steering column 91 in the vehicle front and rear direction to surround the outer circumference of the steering column 91. A protrusion is provided at the upper end portion of the power steering mechanism 94, and a through hole is formed through the protrusion in the vehicle width direction. The tilt shaft bolt 83 is inserted into the through hole.

Thus, the through hole of the power steering mechanism 94 and the tilt shaft openings 81A, 81A (see FIG. 11) formed in the side walls 82A, 82A of the steering lower bracket 81 are aligned (axial alignment). Furthermore, the tilt shaft bolt 83 is inserted into the through hole and the tilt shaft openings 81A, 81A which are thus coaxially arranged. The shaft end of the tilt shaft bolt 83 is screwed into a nut.

Thus, the power steering mechanism 94 and the steering column 91 are supported by the steering bracket 80 via the tilt shaft bolt 83 to be rotatable in the vehicle upper and lower direction. Thus, the portions of the steering bracket 80 where the tilt shaft bolts 83 are inserted correspond to the first column support points 84, 84 (see FIG. 2).

Furthermore, as described above, the second D seat rear beam 62 is provided with the stud bolts 64D, 64D. The fixed bracket 93 is fastened by the stud bolts 64D, 64D. A movable bracket 92 is accommodated inside the fixed bracket 93. The steering column 91 is inserted into the movable bracket 92. The movable bracket 92 is displaceable in the vehicle upper and lower direction relative to the fixed bracket 93.

With the configuration described above, the portions of the second D seat rear beam 62 where the stud bolts 64D, 64D are provided correspond to the second column support points 85 (see FIG. 2) for supporting the steering column 91.

<Behavior in Response to Input of Load>

Figure 18:
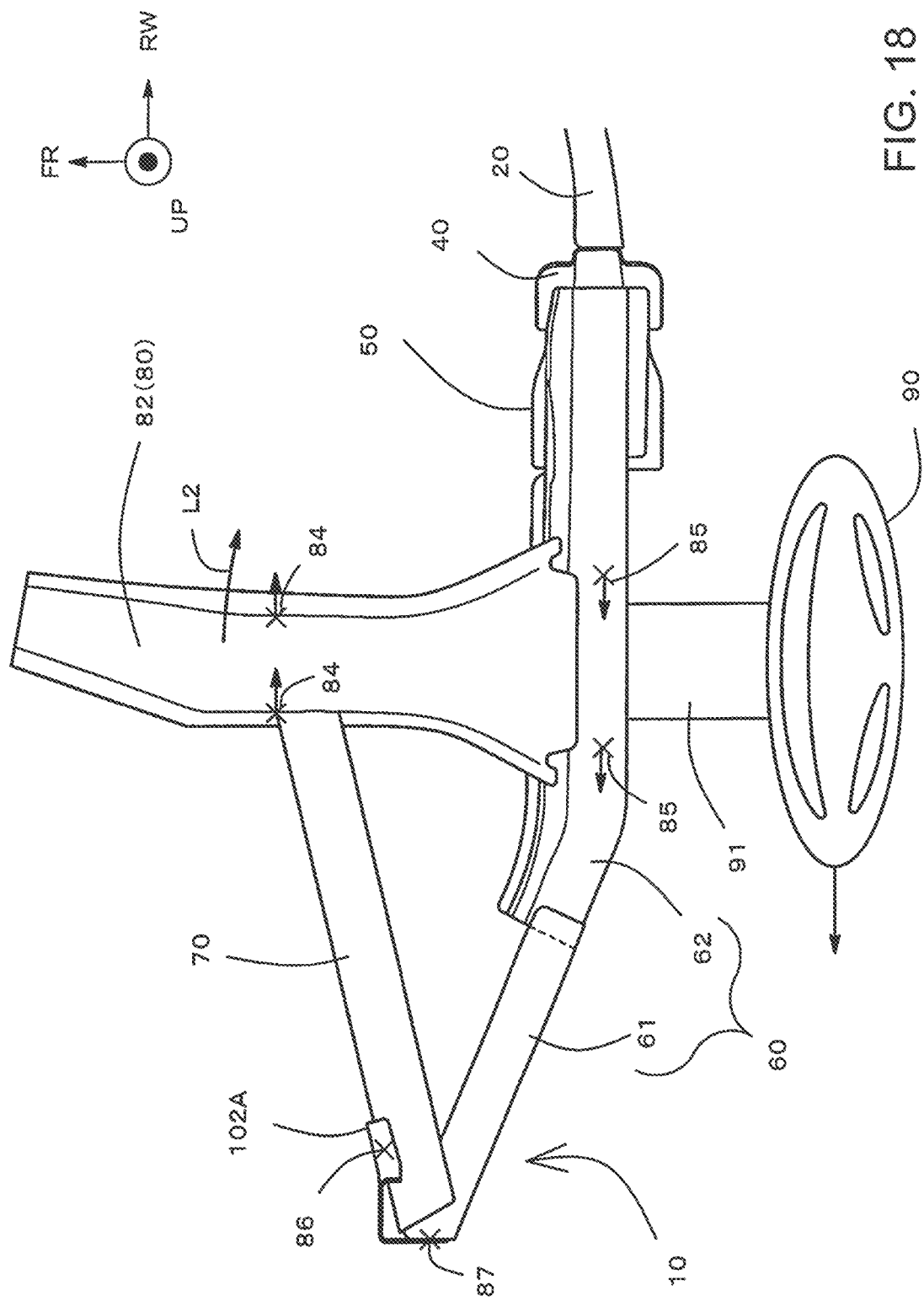
FIG. 18 is a plan view illustrating a transfer path of a load in a left direction input from the steering wheel to the instrument panel reinforcement according to the present embodiment.

FIGS. 17 and 18 illustrate an example of a load transfer path from the steering wheel 90 to the instrument panel reinforcement 10. FIG. 17 illustrates an example where a load toward the right side in the vehicle width direction is input to the steering wheel 90.

The load thus input to the steering wheel 90 is transmitted to the instrument panel reinforcement 10 via the steering column 91, the first column support point 84, and the second column support point 85. Then, at the first column support point 84 in particular, the D seat front beam 70 extending from the point of fixation 86 toward the first column support point 84 receives (struts) the load input from the first column support point 84. The strutting; that is, compressive stress, enables the D seat front beam 70 to maintain the shape against the load from the first column support point 84 (enables deformation to be suppressed). As a result, bending deformation of the entire instrument panel reinforcement 10 is suppressed. Furthermore, the inward deformation of the steering bracket 80 indicated by curved arrow L1; that is, inclination resulting in the displacement of the steering wheel 90 toward the inner side in the vehicle width direction can be suppressed by the reaction (compressive stress) of the D seat front beam 70 arranged obliquely.

FIG. 18 illustrates an example where a leftward load in the vehicle width direction is input to the steering wheel 90. The load thus input to the steering wheel 90 is transmitted to the instrument panel reinforcement 10 via the steering column 91, the first column support point 84, and the second column support point 85. Then, at the second column support point 85 in particular, the first D seat rear beam 61 extending from the point of fixation 87 toward the second column support point 85 receives (struts) the load input from the second column support point 85. The strutting; that is, compressive stress, enables the first D seat rear beam 61 to maintain the shape against the load from the second column support point 85 (enables deformation to be suppressed). As a result, bending deformation of the entire instrument panel reinforcement 10 is suppressed. Furthermore, the outward deformation of the steering bracket 80 indicated by curved arrow L2; that is, inclination resulting in the displacement of the steering wheel 90 toward the outer side in the vehicle width direction, can be suppressed by the strutting (compressive stress) of the first D seat rear beam 61 arranged obliquely.

Figure 19:
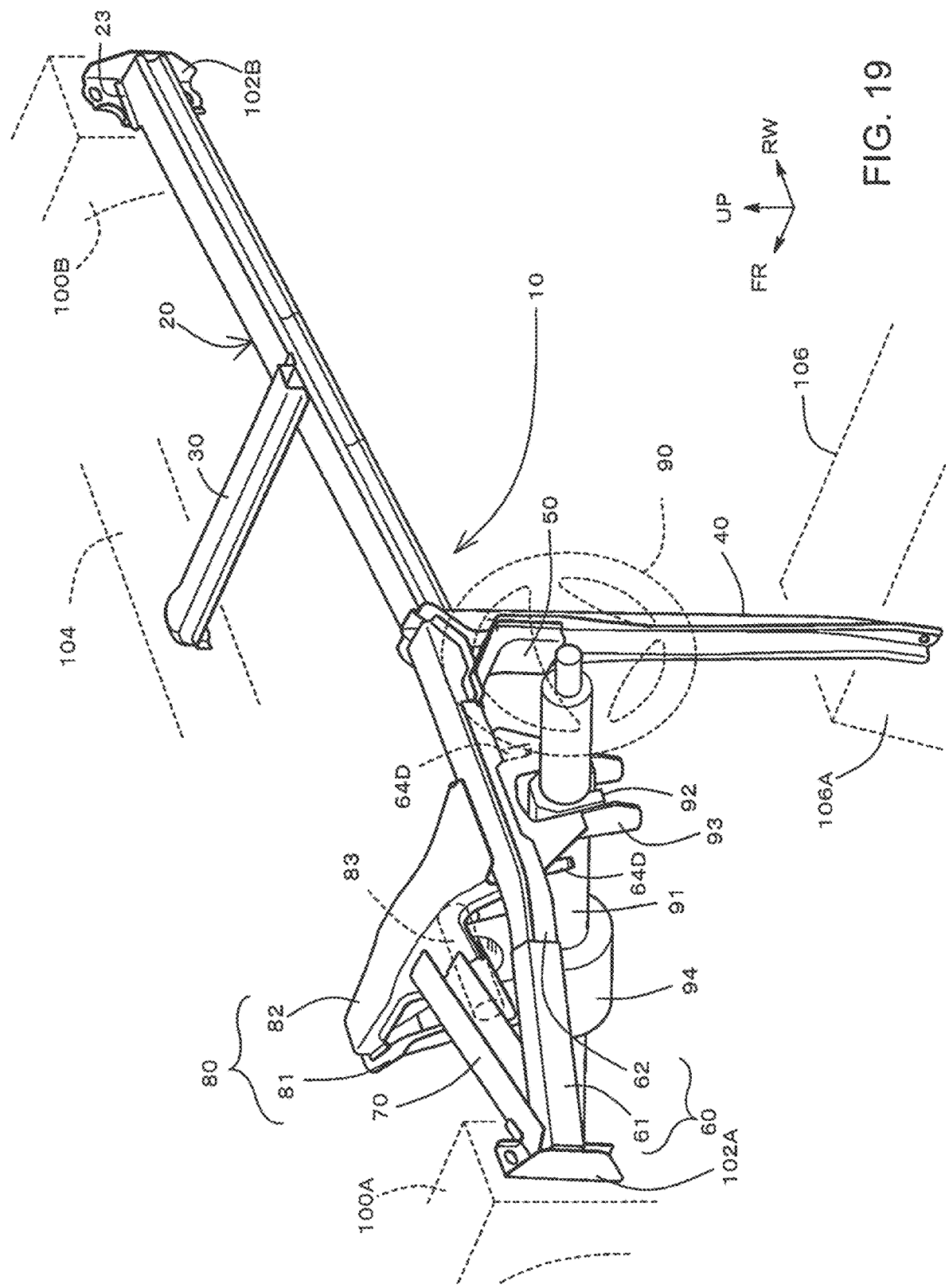
FIG. 19 is a diagram illustrating another embodiment of the steering support structure according to the present embodiment.
Figure 20:
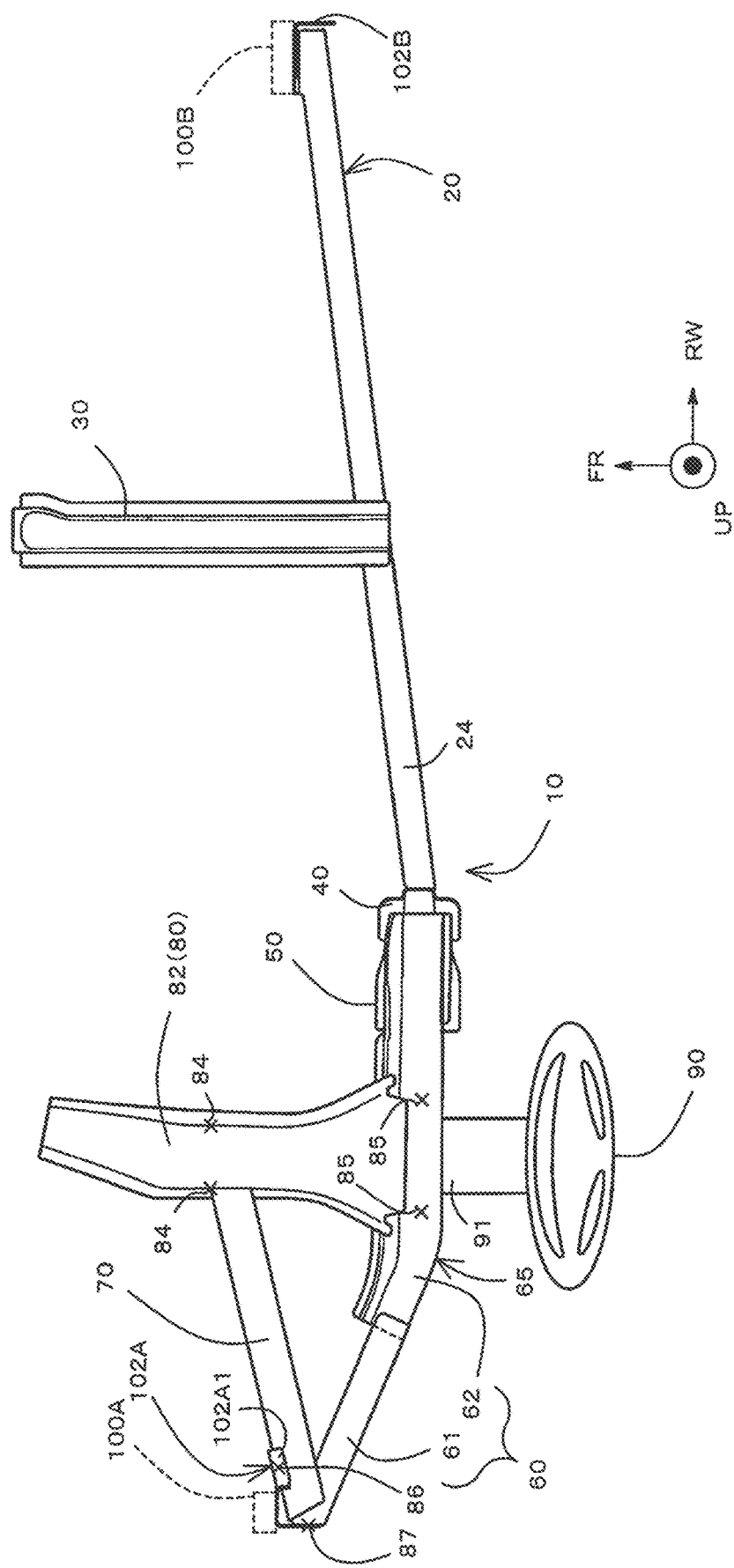
FIG. 20 is a plan view of the example illustrated in FIG. 19.
Figure 21:
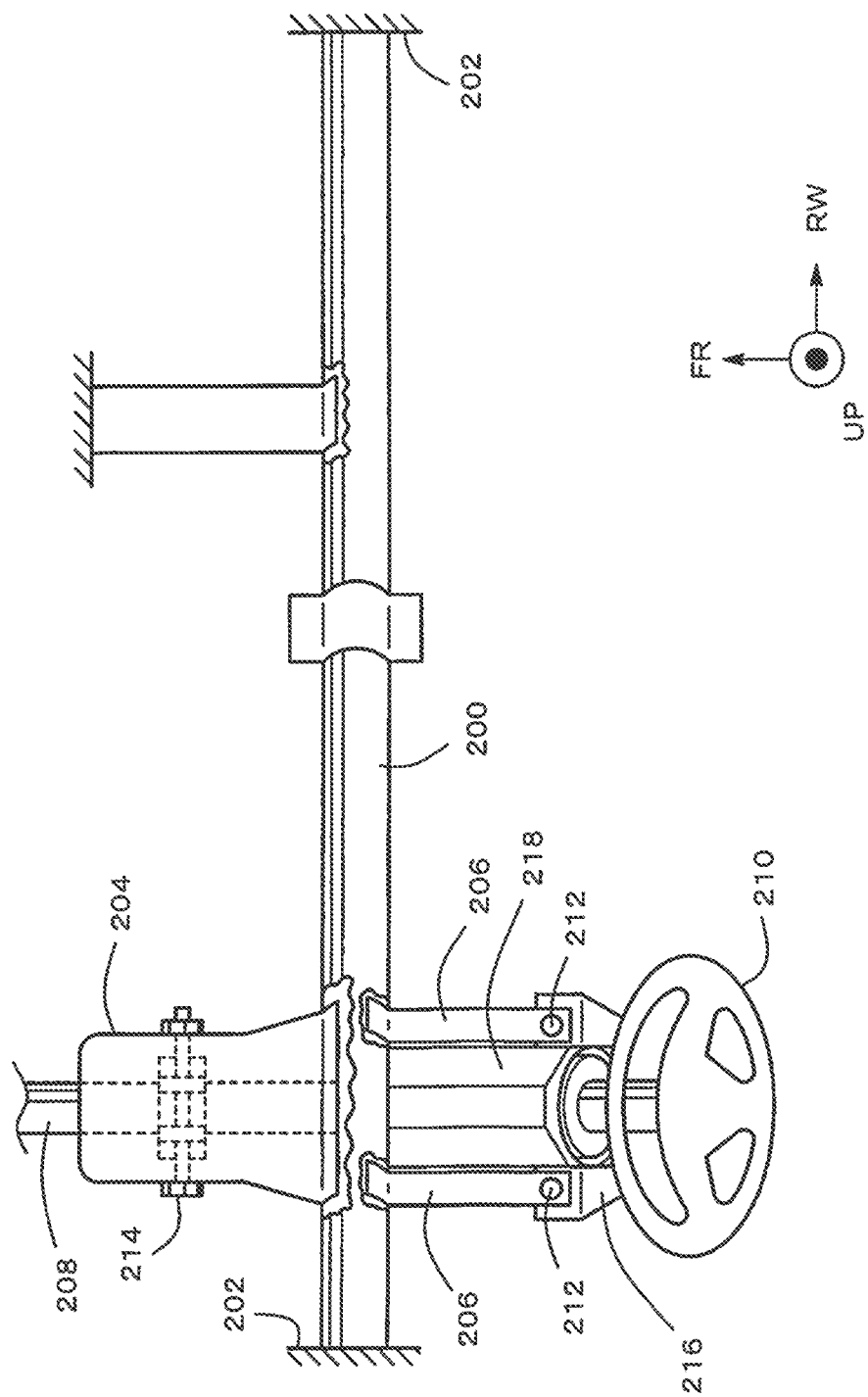
FIG. 21 is a plan view illustrating a conventional steering support structure.
Figure 22:
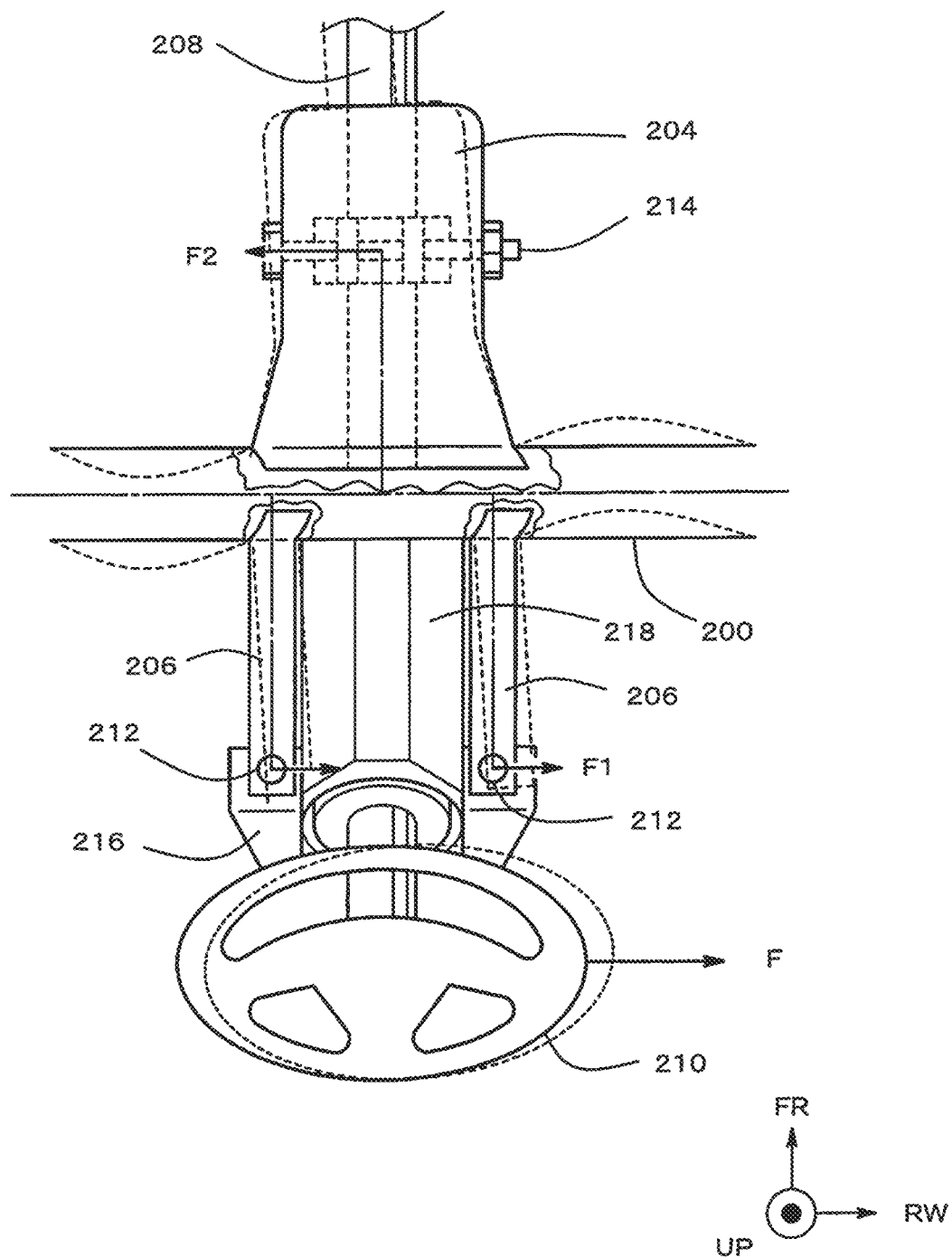
FIG. 22 is a plan view illustrating a state where a load is input from a steering wheel to the conventional steering support structure.

Another Example of Instrument Panel Reinforcement According to the Present Embodiment FIGS. 19 and 20 illustrate another example of the instrument panel reinforcement 10 according to the present embodiment. This instrument panel reinforcement 10 according to this other example is different from the instrument panel reinforcement 10 illustrated in FIG. 2 in the shape of the P seat beam 20.

Specifically, whereas the shape of the P seat beam 20 in FIG. 2 is a curved shape including the bent portion 26 in plan view, the P seat beam 20 illustrated in FIGS. 19 and 20 has a linear shape in plan view. More specifically, the P seat beam 20 has an inner end in the vehicle width direction joined to the floor brace 40, extends linearly, from the joined portion, toward the outer side in the vehicle width direction and toward the front side in the vehicle front and rear direction, and has an outer end in the vehicle width direction joined to the front pillar bracket 102B.

With such a linear P seat beam 20, the instrument panel reinforcement 10 can withstand (strut) the load from the steering wheel 90 in the vehicle width direction. For example, as shown in FIG. 17, when a load toward the right side in the vehicle width direction is input to the steering wheel 90, the D seat front beam 70 receives (struts) a load toward the left side in the vehicle width direction input from the first column support point 84.

Furthermore, the load toward the right side in the vehicle width direction input from the second column support point 85 is received (strut) by the P seat beam 20. With such a linear P seat beam 20, the load toward the right side in the vehicle width direction input from the second column support point 85 can be received by the D seat front beam 70 and also by the P seat beam 20, so that the deformation can be suppressed.

The present disclosure is not limited to the present embodiments described above, and includes all changes and modifications without departing from the technical scope or the essence of the present disclosure defined by the claims.

The invention claimed is:

1. A steering support structure comprising:
an instrument panel reinforcement having both ends in a vehicle width direction fixed to frame members of a vehicle; and
a steering bracket that is fixed to the instrument panel reinforcement and extends in a vehicle front and rear direction,
wherein the instrument panel reinforcement includes
a D seat front beam having an outer end in the vehicle width direction fixed to one of the frame members on a driver's seat side,
a D seat rear beam that is disposed further on a rear side in the vehicle front and rear direction than the D seat front beam, and has an outer end in the vehicle width direction fixed to one of the frame members on the driver's seat side, and
a P seat beam having an inner end in the vehicle width direction connected to an inner end in the vehicle width direction of the D seat rear beam and having an outer end in the vehicle width direction fixed to one of the frame members on a passenger's seat side,
wherein the steering bracket is fixed to the D seat rear beam and has a portion extending toward a front side in the vehicle front and rear direction from a point of fixation to the D seat rear beam, the portion being provided with a first column support point for supporting a steering column,
wherein the D seat front beam has an inner end in the vehicle width direction fixed to the first column support point, and a point of fixation of the D seat front beam to the frame member is provided further on a rear side in the vehicle front and rear direction than the first column support point, and
wherein the D seat front beam extends toward an inner side in the vehicle width direction and toward the front side in the vehicle front and rear direction, from the point of fixation to the frame member toward the first column support point.

2. The steering support structure according to claim 1,
wherein the instrument panel reinforcement includes a grooved member having a squarish U-shaped cross section in a direction orthogonal to an extending direction.

3. The steering support structure according to claim 2,
wherein the D seat rear beam is provided with a second column support point for supporting the steering column,
wherein a point of fixation of the D seat rear beam to the frame member is provided further on the front side in the vehicle front and rear direction than the second column support point, and
wherein the D seat rear beam includes a first D seat rear beam that extends toward the inner side in the vehicle width direction and toward the rear side in the vehicle front and rear direction toward the second column support point from the point of fixation of the D seat rear beam to the frame member.

4. The steering support structure according to claim 3,
wherein the point of fixation of the D seat front beam to the frame member and the point of fixation of the first D seat rear beam to the frame member are disposed close to each other,
wherein the first D seat rear beam is formed to have a grooved shape with a squarish U-shaped cross section open toward the front side in the vehicle front and rear direction,
wherein the D seat front beam is formed to have a grooved shape with a squarish U-shaped cross section open toward the rear side in the vehicle front and rear direction, and
wherein a closed cross section is formed with the first D seat rear beam and the D seat front beam overlapped with each other around the points of fixation to the frame member.

* * * * *